United States Patent [19]

Moore

[11] Patent Number: 5,068,850

[45] Date of Patent: Nov. 26, 1991

[54] PARAMETER VALUE COMMUNICATION SYSTEM

[75] Inventor: Leonard W. Moore, Northridge, Calif.

[73] Assignee: Moore Industries-International, Inc., Sepulveda, Calif.

[21] Appl. No.: 365,168

[22] Filed: Jun. 12, 1989

[51] Int. Cl.[5] ........................................ H04L 5/22

[52] U.S. Cl. ........................ 370/85.8; 340/825.08

[58] Field of Search .................. 370/85.1, 85.8, 95.2; 340/825.08

[56] References Cited

U.S. PATENT DOCUMENTS

| | | | |
|---|---|---|---|
| 3,755,628 | 8/1973 | Games et al. | 370/85.8 |
| 3,990,036 | 11/1976 | Savit . | |
| 4,144,410 | 3/1979 | Flickinger et al. . | |
| 4,326,287 | 4/1982 | Abramson . | |
| 4,430,700 | 2/1984 | Chadima et al. . | |
| 4,481,626 | 11/1984 | Boggs et al. . | |
| 4,571,588 | 2/1986 | Lee et al. | 340/870.13 |
| 4,594,707 | 6/1986 | Merritt et al. . | |
| 4,638,473 | 1/1987 | Cooperman et al. . | |
| 4,770,842 | 9/1988 | Kelly et al. . | |
| 4,933,676 | 6/1990 | Hauge et al. | 370/85.1 |
| 4,972,184 | 11/1990 | Go et al. | 370/85.8 |

FOREIGN PATENT DOCUMENTS

| | | |
|---|---|---|
| 0296022 | 6/1988 | European Pat. Off. . |
| 2801209 | 7/1979 | Fed. Rep. of Germany . |
| 2535133 | 10/1982 | France . |

OTHER PUBLICATIONS

March, R., "Remote Digitizing In A Distributed Data Logger System", *Weston 88/Conference Record*, vol. 32, North Hollywood, CA, U.S., pp. 1–6.

Schwartz, S., "1Chipnet Als Sensorschnittstelle Zur Kopplung Vom Sensor Bis Zum PC", *Messen Prufen Automatisieren*, Nov. 1988, vol. 25, No. 11, pp. 573–577.

Thomesse, J. P. et al., "An Industrial Instrumentation Local Area Network", *Proceedings of IECON* '86, Milwaukee, WI, U.S., Sep. 29–Oct. 3, 1986, vol. 1, pp. 73–78.

Staff, Technical Planning and Development Group of Oregon State University, "A Digital Measurement And Control System Coupled With An Undulating Profiler", *Proceedings 1986 Working Symposium on Oceanographic Data Systems*, IEEE Computer Society, 1986, pp. 85–89.

Turck Multiprox Inc., SAE 1300 Series Two-Way Multiplexer, Catalog Sheets, pp. 1–12.

Electromatic Controls Corporation, Dupline® 128 2-Wire Multiplexing System, Catalog Sheets, pp. 1–52.

*Primary Examiner*—Douglas W. Olms
*Assistant Examiner*—Melvin Marcelo
*Attorney, Agent, or Firm*—Welsh & Katz, Ltd.

[57] ABSTRACT

A multipoint communications system for transmitting the values of a multiplicity of analog parameters from one point digitally to another point and reconverting then into analog parameters. The system includes a plurality of input modules which communicate with respective output modules over a communications link. The input and output modules are configured similarly with a control processor connected to either multiplexing circuitry, in the case of an input module, or demultiplexing circuitry in the case of an output module. The multiplexing circuitry is connected to a plurality of configurable input circuits which receive the values of the various measured conditions or parameters. The demultiplexing circuitry is connected to a plurality of configurable output circuits which output the values of the various measured conditions or parameters. In a preferred protocol, a link master is chosen from among the input modules to generate a polling sequence for the input-output module pairs.

16 Claims, 16 Drawing Sheets

| | | | |
|---|---|---|---|
| CX, | X = 1-8 | IM | WAKE UP |
| DX, | X = 1-8 | OM | WAKE UP |
| OF | | IM | READY |
| OE | | OM | READY |
| 51 | | IM | GO AHEAD |
| 41 | | IM | DATA |

MEMORY AND MEMORY CONTROL
162
ADDRESS CONTROL AND DECODING
166
DUAL CONVERTER
164
DIN
AIN
DOUT
AOUT
FROM INPUT CIRCUITS
TO OUTPUT CIRCUITS
TO MUX DEMUX
R1,R2
W1,W2
9
OE
CE
CE
KEY PAD
168
TO MUX,DEMUX
161
ADØ-AD7
A8-A12
A8-A15
PORT 1 PØ P7
AS
DS
R/W
DM
PORT Ø PØ P7
μ PROCESSOR
PORT 3 P1 PØ P7
RESET P2
E PG
PORT 2 PØ P7
DIN
SERIAL IN
SERIAL OUT
160
POWER LOW
COMMU-NICATIONS
DE
174
WD TIMER
176
+V
WD
10
8
R/W
RS
LCD DISPLAY
172

SUCCESSIVE APPROXIMATION REGISTER
CLK
STB
DIN
Q3
Q10
DO
D/A CONVERTER
DB0
DB7
RFB
+OUT
-IN
Vref
AI
AD
CS
WR
A OUT
A IN
D IN
DFT ADJ
Vref IN
Agnd IN
*AD CLK
SARS
D OUT
DACLSB
DACCS
*ADEN
+V
300
302
304
306
308
310
312
314
316
318
320
322
324
326
328
330
332
334
336
338

| INPUT | JA | JB | JC | JD |
|---|---|---|---|---|
| VOLTAGE | | | | |
| CURRENT | X | | | |
| CONTACT CLOSURE | | X | X | X |
| TTL | | | | |

| OUTPUT | JA | JB | JC | JD | JE | JF | JG | JH |
|---|---|---|---|---|---|---|---|---|
| VOLTAGE | | X | X | X | | X | | |
| CURRENT | X | | X | | | X | | |
| CONTACT CLOSURE | X | | | | X | | | |
| TTL | X | | | | X | | | X |

PARAMETER VALUE COMMUNICATION SYSTEM

BACKGROUND OF THE INVENTION

The invention pertains generally to communication systems and is more particularly directed to communication systems used in conveying the values of a multiplicity of analog parameters from one point to another.

In large process control or monitoring systems there is a need to communicate the values of analog parameters from one point to another. In control systems, the values of parameters from sensors representing measured physical conditions of the process are communicated to the control and the values of parameters representing control variables are communicated to actuators. In many instances, the number of input variables and the number of control variables in such systems can be quite extensive. Because each input and output necessitates a connection, the cabling plant of a large multivariable system can grow rapidly to where it becomes somewhat unmanageable. In addition, when a distributed process is being controlled or monitored, the cabling plant from the remote sensors and actuators can become even more burdensome and expensive. The cost and complexity of the cabling plant grow directly with the number of sensed, monitored, or controlled devices and their distance from the processor of the system.

What is needed is a technique for concentrating the sensor and control information to reduce the cabling and connection costs of these systems. Many times in distributed processing, monitoring, and control systems multiplexers and local area networks are used. Such systems concentrate information from various sources into a digital format and transmit it on a communication link to the controller or monitor.

However, local area networks in many situations are not advantageous because the base control or monitoring system must be replaced along with the cabling. This is because the system protocols, network requirements and information rates of the LAN are incompatible with the base control or monitoring processor. For many installations where significant investments have been made in the base systems, such network solutions are untenable and may even be incompatible with the control or monitoring system requirements. Thus, there is a considerable need in these types of installations for a system which can concentrate information to reduce the cabling and connection costs of the sensors and actuators, but can also contemporaneously expand the information after the transmission so the information presented to a base control or monitor processor is compatible with the prior installation investment.

Such a system must also be extremely flexible in order to take into account the variety of different sensors and actuators which these systems may include. In general, many sensors provide either voltage source, current source, contact closure, or TTL type signals and most actuators can be controlled by these types of signals. Further, the system must be expandable to handle multiple inputs and outputs from distributed points and different sizes of systems. Such a system should include a communication protocol that is exact so that a multiplicity of variables can be accurately conveyed from the sensors and to the actuators. The system must also remain inexpensive and uncomplicated to meet the primary objective of relieving congestion of the cabling plant in such monitoring and control areas.

SUMMARY OF THE INVENTION

The invention provides a novel multipoint communication system for analog and discrete signals which is accurate and flexible while remaining uncomplicated and inexpensive. The system comprises a plurality of input modules which communicate with a plurality of corresponding output modules over a communication link. Each input module has a group of inputs which communicate to a corresponding group of outputs of the associated output module thereby providing a mirror image of the inputs, even though the inputs and outputs are separated by the communications link. In this manner, information from the inputs is concentrated for an efficient communication process and then expanded to the outputs after transfer to make the communication process transparent.

The input and output modules are configured similarly with a control processor connected to either multiplexing circuitry, in the case of an input module, or demultiplexing circuitry, in the case of an output module. The multiplexing circuitry is connected to a plurality of configurable input circuits which receive the values of the various measured conditions or parameters. The demultiplexing circuitry is connected to a plurality of configurable output circuits which output the values of the various measured conditions or parameters. Connecting each input module to its associated output module is the communication link which provides digital data transfer in either direction according to a system protocol.

In general, the control processor of an input module controls the multiplexing circuitry to input analog parameter values from the input circuits. The parameter values are sequentially digitized, stored and then transmitted by the input control processor to the output control processor via the communication link. The output module receives the digital representation of the parameter values, stores them sequentially converts them back into analog parameter values, and distributes them to the correct output circuits by controlling the demultiplexing circuitry. The output signals of the output circuits thereby appear to be at the same physical location as the apparatus which are generating the input signal values to the inputs circuits. The parameter values are thus communicated from one point to another point by this transparent communication scheme.

According to one aspect of the invention, a multiplicity of parameter values can be communicated by the system in this manner. Multiple input modules can communicate with corresponding multiple output modules providing flexibility in the number of overall inputs and outputs of the system. The type of module which is assigned to each point of the communication link can be varied depending upon the use of the system. If there are only sensors at a point, an input module can be used to communicate their parameter values to an output module at the control. If there are only actuators at a point, an output module can be used to receive parameter values from an input module at the control. Similarly, an input module and an output module can be used at various points to communicate to other modules at a different point. Because the communication system configuration is transparent to a control or monitoring system, system expansion can also be accomplished by several such configurations.

In a system configuration mode, each input-output module pair that is present in the system is assigned an address allowing the system to recognize its presence and system location regardless of its physical location. Further, the configuration mode permits the assignment of the inputs to their corresponding outputs and the type of signal communicated. The input circuits are configurable for different types of analog and discrete signals including current, voltage, transistor logic (TTL) compatibility and contact closure (discrete). Similarly, the output circuits are configurable to output the same types of signals including current, voltage, TTL, and contact closure.

According to another aspect of the invention, the system includes a calibration mode where the ranges for the input signals from each input circuit are measured and stored to provide an accurate conversion of each analog signal into a digital value which is a percentage of the range. In this manner the digital values which are transmitted are absolute in that they carry no dimensional or unit information with them. This permits the system to communicate the digital values from a plurality of different types of input circuits to a plurality of different types of output circuits in a uniform manner. In addition, when the system is reconfigured, the transmission protocol does not have to be changed and any input circuit can be used for any type of input permitted and communicate that parameter to any output circuit.

According to still another aspect of the invention, the system includes an alarm mode which allows the system faults which have accumulated in an alarm log to be processed and acknowledged, either by clearing them or displaying them for diagnostic purposes.

The operational modes of communicating the parameter values, calibration, configuration, and alarm processing are regulated by the control processor of a module by means of an interactive interface which is menu driven for easy control by an operator. Because of the system communications protocol, when a module pair is not in the communication mode, the rest of the system can continue to operate without being affected. This allows parts of the system to be reconfigured, repaired or recalibrated without the necessity of taking the entire system out of service.

In a preferred system protocol, a link master is chosen from among the input modules to generate a polling sequence for the input-output module pairs. A poll of a particular module is taken by generating a wake-up message, to which the module responds with a ready message. When a ready message is received, the link master generates a go-ahead signal and becomes dormant for a time period before continuing. Otherwise, if a ready message is not received, the poll will immediately continue. When an input module has permission to communicate, it sends a wake-up message to its corresponding output module, which responds with a ready message. When the selected input module receives a ready message, it transmits the plurality of stored digital values corresponding to the analog parameter values which were input. After transmission, the link master times out of its idle mode and continues to poll for the next input-output module group.

These and other objects features and aspects of the invention will be better understood and more fully described from a reading of the accompanying detailed description in conjunction with the appended drawings wherein:

DETAILED DESCRIPTION OF THE PREFERRED EMBODIMENT

Figure 1:
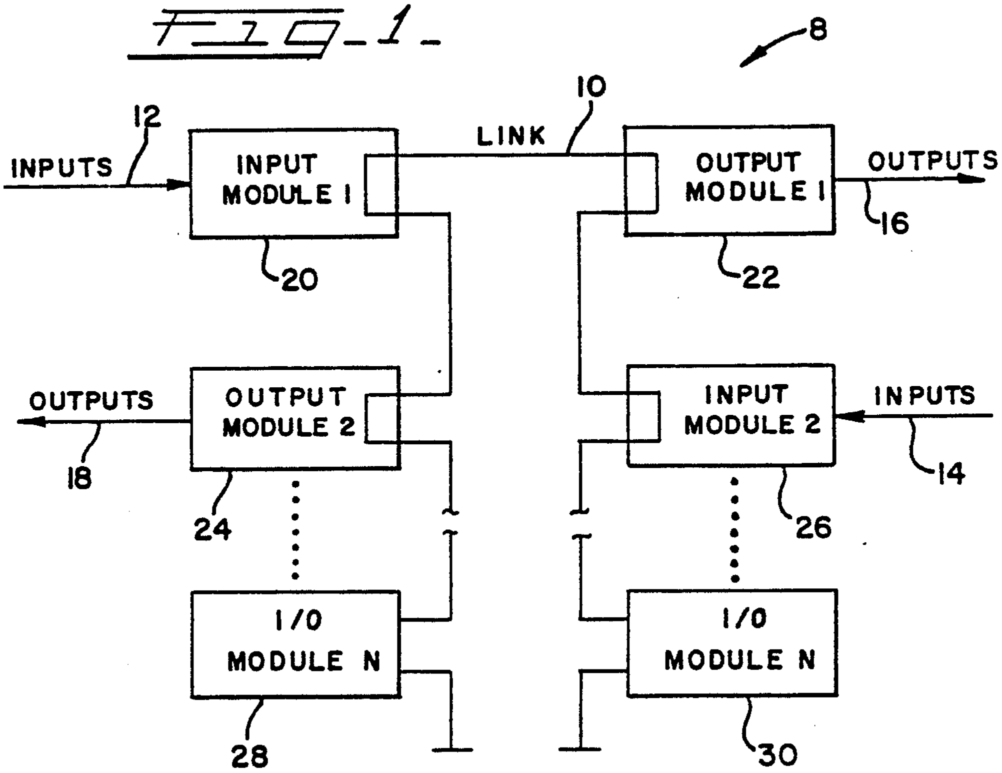
FIG. 1 is a system block diagram of a parameter value communication system constructed in accordance with the invention.

The invention is shown to advantage in FIG. 1 as a parameter value conversion and communication system 8. A plurality of input modules 1 . . . N communicate with a corresponding plurality of output modules 1 . . . N over a digital communication link 10 which allows digital data to be transferred from an input module to an output module. The system, in accordance with the invention, has the input modules which convert a plurality of analog and discrete parameters from inputs 12, 14 to digital values and communicate them to the corresponding output modules which receive the digital values and reconvert the parameters back into analog values for outputs 16, 18. Thus, the outputs 16, 18 of the output modules are mirror images of the inputs 12, 14 of the input modules and the communication is transparent.

Each input module has several multiplexed inputs and each output module has several corresponding demultiplexed outputs. The input and output modules may be placed at any point on the communication link 10 to provide a completely flexible communication system. Preferably, the communication link 10 is a twisted pair cable with an EIA 485 standard interface at each module. Each module, whether it be an input or an output module, is a combination receiver and generator for this standard. One extended portion of the communications link 10 is permitted along the twisted pair and modules on either side of the link extension are required to be drop loops. The extended portion of the communication link may be repeated, or a standard twisted pair cable of up to two miles.

Figures 2, 3:
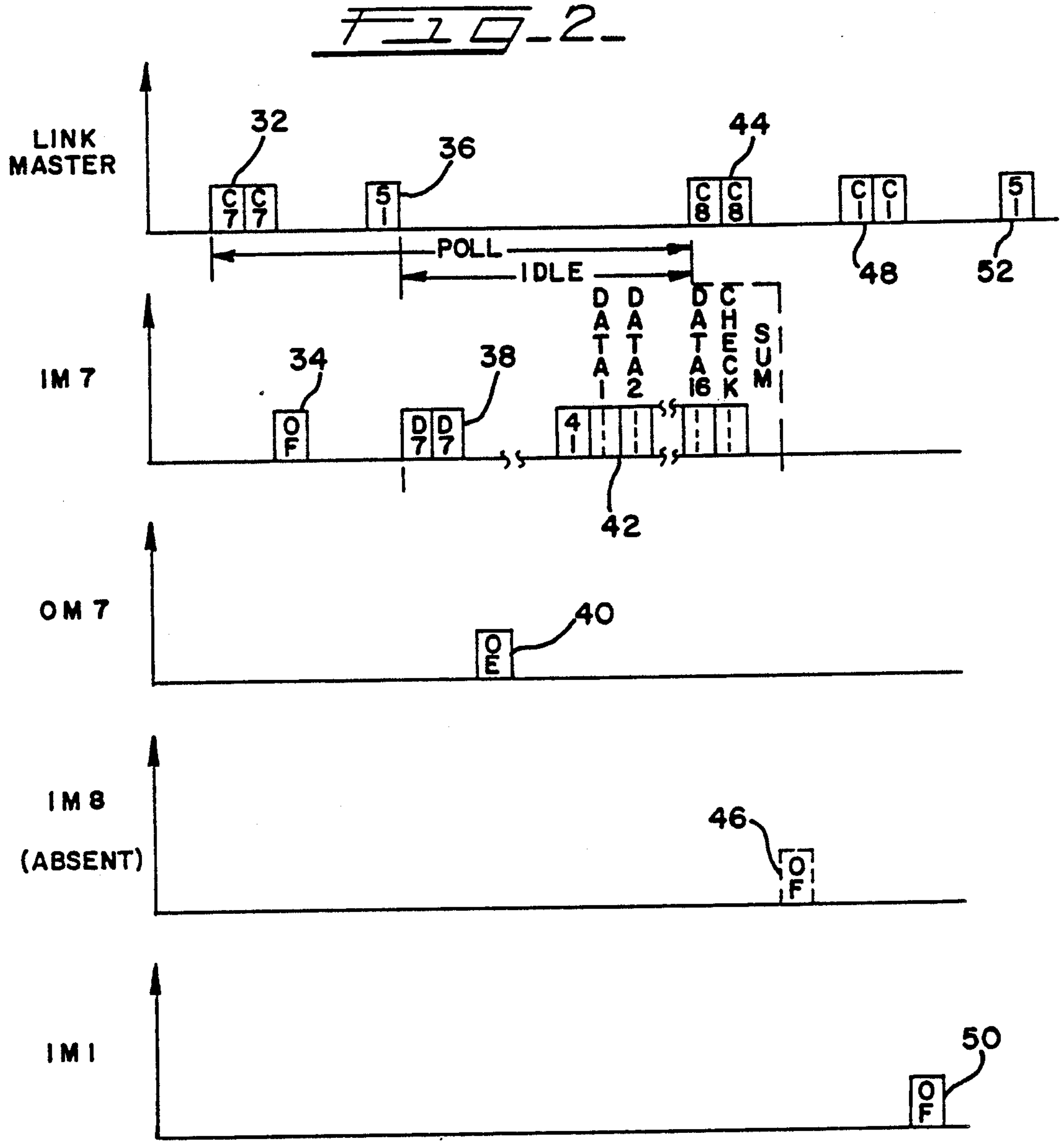
FIG. 2 is a pictorial timing diagram of the communication protocol for the system illustrated in FIG. 1.
FIG. 3 is a tabular representation of the control characters of the protocol illustrated in FIG. 2.

The system communicates between modules in a digital manner by assigning one of the input modules to be a link master. The protocol for the communication system is more fully illustrated in FIG. 2. The link master controls a polling sequence where every input module 1 . . . N is sent a "wake-up" message 32. The unique wake-up code Cx, where x is the assigned module number, is recognized by the particular input module. If it is present in the system and operating in communication mode, it will reply to the link master with a "reply" message 34. The reply message indicates to the link master that the particular input-output module of combination IM7–OM7 is present in the system configuration and is operative. The link master then transmits a "go-ahead" message 36 to the presently addressed input module and idles itself for a predetermined period to allow the selected input-output module combination to communicate. If the link master does not receive a reply message, for example, the "reply" 46 for IM8 is absent, it will skip the go-ahead message to the particular input-output module combination addressed and continue to the next input-output module combination in the polling sequence at 48.

When granted permission with the ready message (hexidecimal) 51, the input module IM7 transmits a "wake-up" message 38 to its associated output module OM7 which then replies with a "ready" message 40. In response to the ready message (hexidecimal) 0E, the input module IM7 transmits a data message 42 which is a series of data bytes comprising the parameter values of the inputs. In general, the data message 42 comprises 35 bytes where the lead byte of the data message is a unique identifier (hexidecimal) 41. The next 32 bytes are 2 bytes of data from each of the sixteen input channels. The 34th and 35th bytes of the data message form a check sum for the entire data message. After the data message is completed, the link master will time out of its idle cycle and continue the poll for the next input-output module combination at 44.

Figure 5:
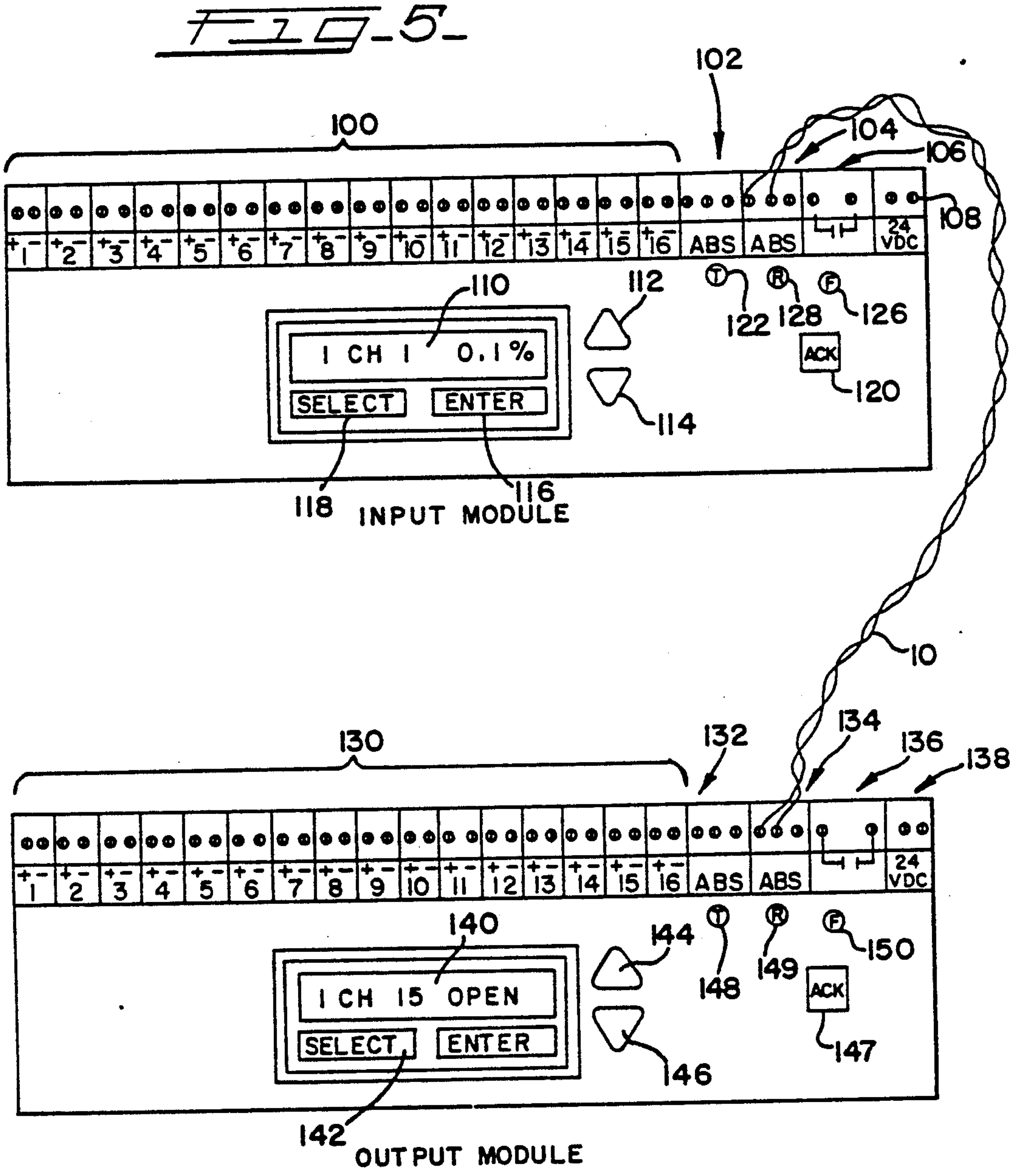
FIG. 5 is a pictorial representation of the operator interface for an input module and an output module of the system illustrated in FIG. 1.

Each module operator interface, whether input or output, appears similar to an operator and can be used to input and output data to the module. As more fully detailed in FIG. 5, the interface of an input module comprises a row of screw terminals for connection to the input channel circuits, a display, a number of input keys, and a number of status LEDs. The 16 input circuits are individually connected to screw terminals 100, each having a (+) terminal and a (−) terminal. There are two sets of communications terminals 102, 104; one for connection to the communication link 10 and the other for the chaining of the drop loops for other modules at the particular location. The last two groups of terminals 106, 108 allow the module to operate a fault relay and to be powered by 24V AC or DC power, respectively.

A display 110 is formed from one line of a 16 character dot matrix LCD display which communicates operating, calibration, configuration, and fault information to an operator. The operator is able to select from different modes, and options within modes, with five operator keys 112, 114, 116, 118, and 120. The SELECT key 118 permits the operator to select one of the several modes available to the system while the SCROLL UP key 112 and SCROLL DOWN key 114 permit a display of menu selections for each mode. The ENTER key 116 is then used to select the menu choice desired. An ACKNOWLEDGE key 120 is used to handle the alarms of the system. Three status LEDs 122, 124, and 126 complete the front panel of the input module. The transmit LED 122 is lighted to indicate transmission is occurring from the module while the receive LED 124 is lighted to indicate information reception at the module. When lighted, a fault LED 126 alerts the operator of a fault condition.

The output module is similarly configured having screw terminals 130 which connect to the output circuits, two communication terminal sets, 132, 134 two power supply terminal sets, 136, 138 an LCD display 140, five manual key switches 142, 143, 144, 146 and 147 for the operations of SELECT, ENTER, SCROLL UP, SCROLL DOWN, ACKNOWLEDGE, respectively, and three status LEDs 148, 149, and 150 for the indication of transmit, receive, and fault status, respectively.

The system provides four major modes of operation including a communication, a configure mode, a calibrate mode and an alarm mode. In the communication mode, the display of a module will register the data for a selected channel. Depending upon whether the module is an input or an output module, the selected data will either be input data or output data. The channels are selected by the use of the SCROLL UP and SCROLL DOWN keys of the keypad.

In the configure mode, the display will register menu selections to allow the user to configure the channels as required. Depending upon whether the module in our input or an output module, the configuration will be of an input circuit or an output circuit. The SCROLL DOWN key of the keypad allows a user to step through four options for each channel. The options are a current option, a voltage option, a TTL option and a contact closure option. The SCROLL UP key on the keypad allows a user to step through 16 channels so that every channel may be configured without having to leave and reenter the configure mode. The ENTER key on the keypad permits the user to return to the main menu. When the configure mode is entered, the module transfers the identity of the channel being displayed immediately prior to entering the configure mode to the display. The present configuration of that channel is then displayed as the option selection. As will be more fully described hereinafter, an option selection additionally requires that some internal jumpers of the corresponding input or output circuit be changed to match the configuration selection.

In the calibrate mode, the display will register menu selections to allow the user to calibrate the channels as required. Depending upon whether the module is an input or output module, the calibrated will be of an input or an output circuit. The SCROLL DOWN key on the keypad permits the user to step through the calibrate menu options. The calibrate menu options include enter zero and enter full. The user must supply the input channel screw terminals at this point with correct analog inputs from a current or voltage source when these requests are displayed. Digital calibration values corresponding to the voltages supplied to the channel are then entered into the RAM for calibration by pressing the ENTER key on the keypad. For an output module, the calibrate options are calibrate zero, calibrate full, and calibrate default which can be selected through the SCROLL UP key. The user must supply a test meter measuring current and voltage on the particular channel for which calibration is requested and the meter can be driven to the required value by pressing the SCROLL DOWN key on the keypad. The resulting value of the calibration for the selected channel is then stored in the RAM by pressing the ENTER key on the keypad. The calibration values indicate the input and output ranges for a particular channel.

In general, the alarms are system alerts. Three conditions are programmed for alarm including a failure of communication over the communications link. This can either be a short or an and open on the communication link, or a failure of one or more modules to communicate. An alarm will register on all input and output modules not able to communicate between themselves or the link master. A second system failure is a power failure. This can be a failure of the power supply within a module, an external power supply or a failure of the AC supply within a plant. There will be no alarm when the power goes off nor during the period that the power is off, but when restored, the alarm LED will flash and the display will indicate "power was off." The last system alarm is a program halt. Should the program of one of the modules halt for any reason, the watch dog timer of the particular module will time out and restart the program. At this point, the alarm will register as a program halt.

The alarms are stored in an alarm log. All alarms that occur are stored in the order in which they were sensed. They are numbered automatically by the module in the order in which they were sensed from 1 to 10. After the tenth alarm, the eleventh and subsequent alarms will overwrite the number ten alarm and the log will show the first nine alarms logged and the last one received. This feature allows intermittent conditions to be recognized. For example, a large number of communication link failure alarms would indicate an intermittent condition on the communication link. When an alarm is cleared from the alarm log by the ACKNOWLEDGE key, any alarms existing with numbers between that one and the cleared alarm will be renumbered one number lower.

Figure 4:
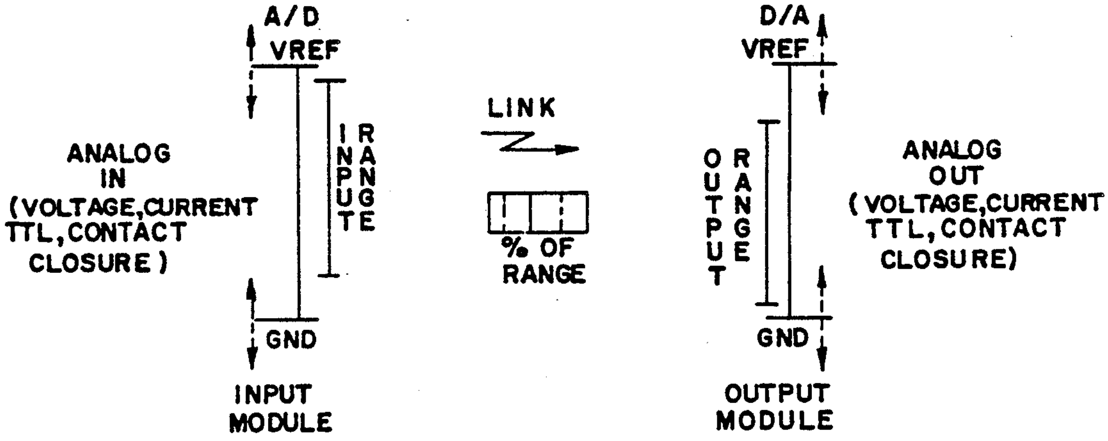
FIG. 4 is a pictorial representation of the transmission of an analog parameter value from one point to another.

The transmission of the parameter values is accomplished digitally so that an accurate representation of an input can be communicated to an output. There are several steps in the conversion-communication-reconversion process which produce the accuracy desired. The process is illustrated pictorially for a channel in FIG. 4. Initially, the digital values of a parameter which are transmitted over the link are absolute in that they are expressed as a percentage of a range. Such expression permits the calibration of each input channel for the range of signals coming from a particular sensor, or the calibration of each output channel for the range of signals which are needed to operate a particular actuator thereby providing compatibility to many types and sizes of these devices. In addition, expressing the digital values in absolute terms permits the same number of bits (2 bytes) and transmission format (FIG. 2) to be used for each channel. Thus, when a channel is reconfigured to another sensor or actuator, or even to another location, the transmission format will be unchanged and the same equipment can be used by the simple expedient of recalibration. Moreover, the information for each channel is transmitted with the same accuracy so that there is no need to select a particular channel for a particular device.

The protocol combines with the transmission format to lend flexibility to the system whereby different data rates can be easily chosen. The system has the flexibility to use faster data rates, increased sampling rates and less modules to increase the update rate for the outputs with respect to the inputs. Conversely, for situations which do not need rapid updating, slower data rates, decreased sampling rates, and more modules can be used without changing the equipment or transmission protocol and format These features lend themselves to the flexibility of the system in meeting the compatibility needs of many installations for which input/output configurations and formats are not readily changed without a substantial loss of investment.

Figure 6:
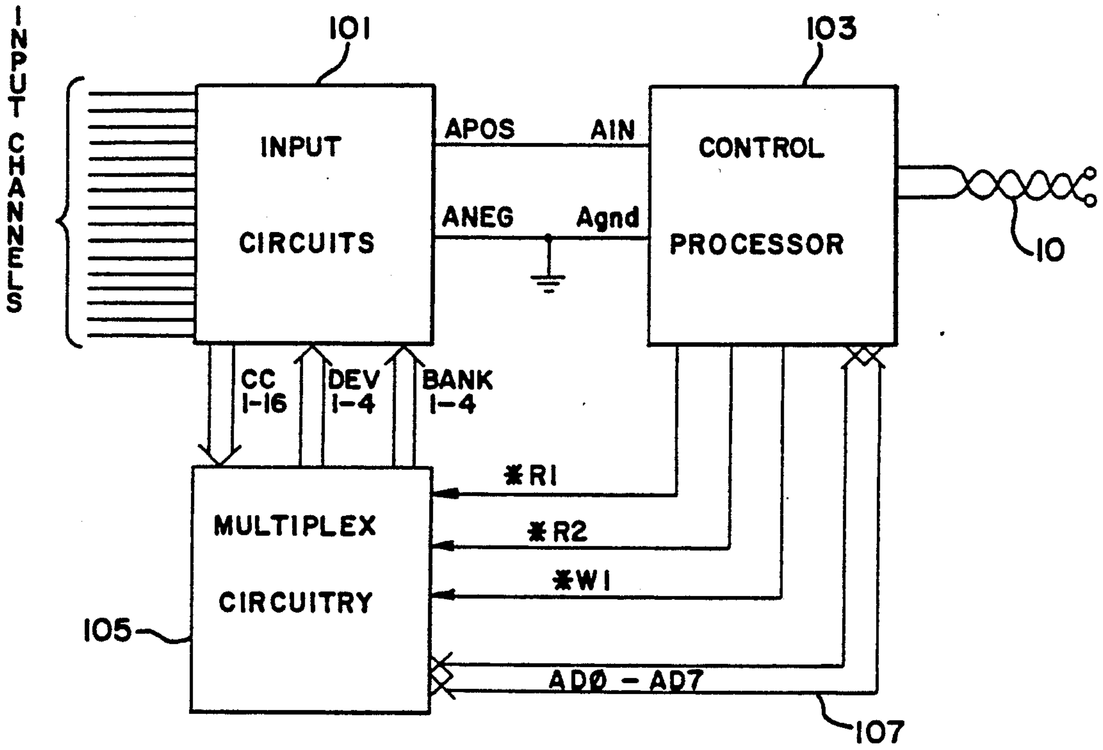
FIG. 6 is a general block diagram of an input module of the communication system illustrated in FIG. 1.

The accuracy of the digital communication over the link is maintained on either end by a conversion process which produces data of a precise nature. The analog-to-digital conversion begins by conditioning a number of different types of inputs—current, voltage, TTL, contact closure into a standard voltage which can be A/D converted with the dual converter. Once the conversion has been accomplished, the raw digital value is converted into an absolute value as a percentage of an input range and stored in the calibration tables for the channel. The converted value is also corrected for reference supply and ground drift by measuring those voltages periodically and storing updated versions of them. The stored values for the reference supply and ground are added to or subtracted from the raw digital data before their conversion to an absolute value. The process is reversed at an output module where the absolute (percent of range) digital values are first converted back into raw digital data by applying the output calibration ranges for the different channels to the absolute data. The digital values are then corrected for the drift of the reference supply and ground voltages before being converted into a standard analog voltage. The standard analog voltage is then conditioned into the type of output desired based on the configuration of the output circuit A general block diagram of an input module is more fully detailed in FIG. 6. The input module includes a plurality of input circuits 101 for conditioning and normalizing a plurality of analog or discrete input signals from analog channels 0–15. The input circuits 101 are connected to multiplexing circuitry 105 which selects each analog signal at the sampling rate and provides a standardized analog voltage signal APOS-ANEG for A/D conversion by a central processor 103. The multiplexing circuitry 102 is controlled by a channel selection address, output to the circuitry over bus 106 as address lines AD0–AD7, and a write signal *W1. The signals are decoded into selection lines DEV1–4, BANK 1–4 which selects the input channel. The analog signal Ain is input to the control processor 103 which converts the analog signal into a digital 14-bit value and stores it for each particular input signal or channel. For discrete signals, contact closure outputs CC1–16 can be read directly into the control processor over data lines AD0–AD7 with read control signals * R1, *R1. When the input module is selected for communication in the previously described protocol, it will then transmit those stored digital values over the communication link 10 to its corresponding output module.

Figure 7:
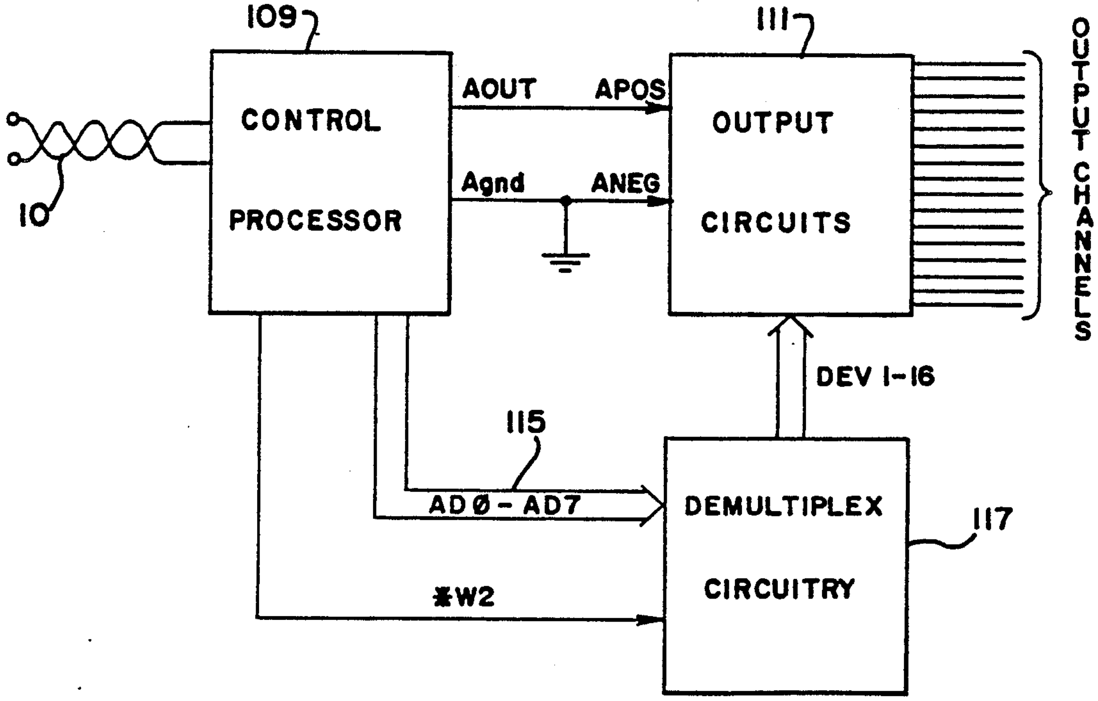
FIG. 7 is a general block diagram of an output module of the communication system illustrated in FIG. 1.

A general block diagram of an output module is more fully detailed in FIG. 7. The output module includes a control processor 109 which receives the digital signals from a corresponding input module and stores them in its memory according to channel location These digital signals are then converted in sequence into a single analog signal $A_{out}$ which is distributed to 16 output circuits 111. Each output circuit conditions and converts the standard analog signal into the particular output configured for the channel. The demultiplexing circuitry 114 distributes the analog signal among the plurality of output circuits 112 by means of the enabling selection lines DEV 1–16. The demultiplexing circuitry selects the particular enabling line by decoding a channel address from lines AD0–AD7 and a write enable signal *W1.

Figure 8:
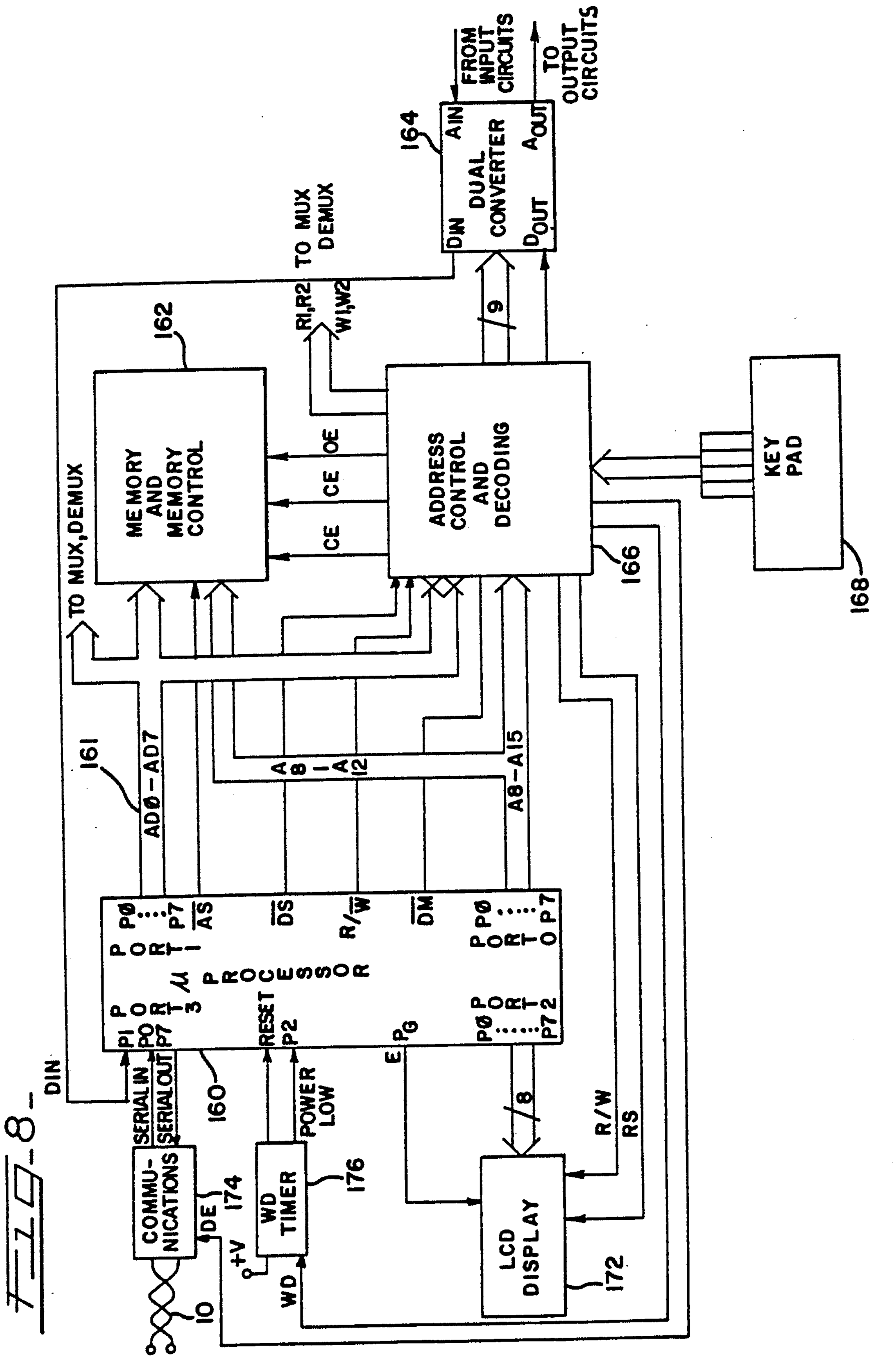
FIG. 8 is a detailed block diagram of a control processor for either an input or an output module of the communication system illustrated in FIG. 1.

Each control processor, illustrated in more detail in FIG. 8, is a microprocessor based control, communication, and conversion circuit which is identical in its hardware configuration for the input and output modules. The duality in function eliminates the need for a redesign of a specialized control processor for each type of module and facilitates the expandability of the system in a modular format. The difference in a control processor for an input module and an output module is the system software which parses the circuits and operations it uses to perform particular functions. In general, a control processor includes a microprocessor 160 with its port 1, pins 0–7, used as a multiplexed address and data bus 161. The address portion of the bus is used for selecting memory locations in a memory and memory control circuit 162. The memory and memory control circuit 162 comprises a read only memory (ROM) and a random access memory (RAM) as will be more fully explained hereinafter. The ROM is used to store the control program for either an input module or an output module and the RAM is used to store the converted input parameters, if an input module, or the received parameters, if an output module. The RAM is further used as scratch pad for various calculations and the values of variables during program execution, as is conventional.

The address lines from port 1 (AD0–AD7) and port 0 (A8–A12) additionally connect to an address control and decoding circuit 166 which addresses and controls the several peripheral devices for the microprocessor 160. The control lines *AS,*DS,R/*W and pin 4 of port 3 (*DM signal) connect to the address control and decoding circuitry 166 for determining which peripheral is accessed and at what time. One of the peripheral devices which is accessed is a dual converter circuit 164 which contains both an analog to digital converter and a digital to analog converter, the one used depending upon whether the module is an input module or an output module. If the dual converter circuit 164 is in an input module, it is used as an analog to digital converter and serial digital values are input to the microprocessor over port 3, pin 1 as the DIGITAL IN signal $D_{in}$. If, however, the dual converter 208 is in an output module, the digital values to be converted to analog signals are output from the address control and decoding circuit 166 to the dual converter 164 via the DIGITAL OUTPUT signal $D_{out}$. If the dual converter 164 is being used in an input module, it connects to the input circuits over an ANALOG IN signal line $A_{in}$. If the dual converter 164 is being used in an output module, then it connects with the output circuits over an ANALOG OUTPUT signal line $A_{out}$.

The multiplexing circuitry connects to the address control and decoding circuitry 166 and to the multiplexed address/data bus AD0–AD7. The bus 161 transfers data on these lines to the multiplexing circuitry to determine which of the plurality of the input signals are to be converted and receives data from the multiplexing circuitry as direct digital input. The demultiplexing circuitry is also connected to the multiplexed address/data bus AD0–AD7 and to the address control and decoding circuit 166. The demultiplexing circuitry receives data corresponding to the output channel address which is to output a signal and control signals for channel selection.

The address control and decoding circuitry 166 is also connected to a key pad 168 and an LCD display 172. The key pad 168 and the display 172 are used to convey information, to change modes, to configure and to calibrate the system as previously described. Input from the key pad 168 is received over the multiplexed address/data bus 161 and data to the display 172 is transferred from the microprocessor 160 over a separate data bus in the form of port 2, pins 0–7.

The address control and decoding circuit 166 further regulates a communication circuit 174 which is used for either receiving digital data from the communication link 10 or transmitting digital data onto the link. The microprocessor 160 is connected to the communication circuit 174 by port 3, pins 0 and 7 which are used as SERIAL IN and SERIAL OUT data lines, respectively.

The last peripheral controlled by the address control and decoding circuit 166 is a watch dog timer 176 which resets the microprocessor at its reset terminal RESET, if not periodically strobed by the circuitry 166 via signal line WD. The watch dog timer also measures the amplitude of the power and provides a power low signal which can be read by the microprocessor 160 at port 3, pin 2, to alert the system of a low power condition.

Figure 9:
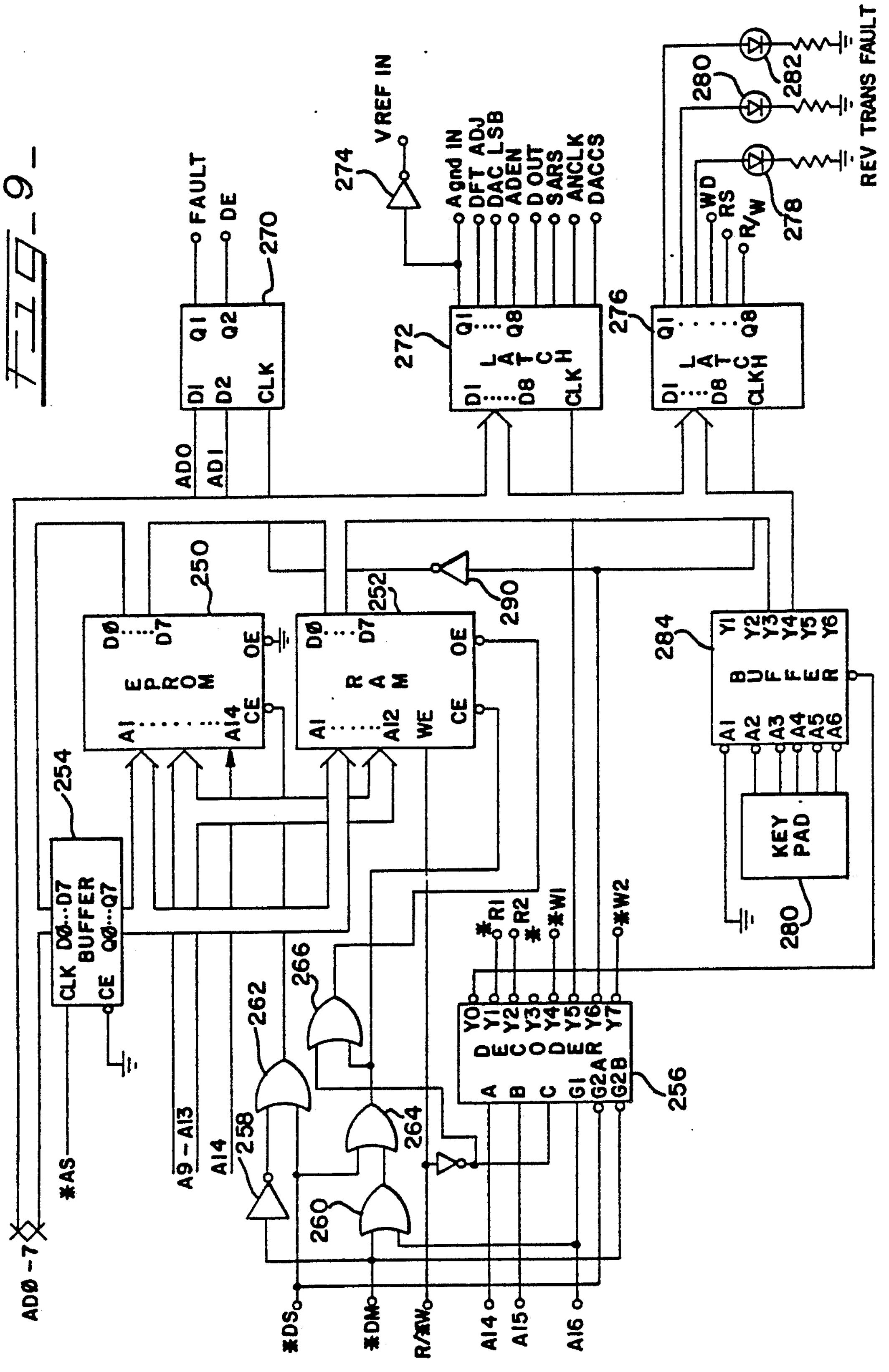
FIG. 9 is a detailed electrical schematic of the address control and decoding circuitry illustrated in FIG. 8.

The detailed circuitry forming the memory and memory control circuitry 162 and the address control and decoding circuitry 166 will now be more fully described with respect to FIG. 9. The memory of a control processor includes a read only memory chip 250 and a random access memory chip 252. The read only memory 250 stores the operational program of the control processor. The random access memory chip 252 is used for storing the image of the input channels or output channels, constants and other variables used in the processing tasks. The memories are addressed at their first eight address inputs A1–A8 with the lines of the multiplexed address/data bus AD0-7 through an 8-bit buffer 254. Address lines A9–A12 for the memories 250 and 252 are from the extended part of the address bus port 0, pins 0–4. The address line A14 for the read only memory 250 is additionally from port 0, pin 5 of the microprocessor 160. The data outputs D0–7 from both memories 250 and 252 are commonly connected to the multiplexed address/data bus lines AD0–7. The output enable input *OE of memory 250 is tied to ground and its chip enable input CE is connected to the output of an OR gate 262 which is part of the address control and decoding circuitry 166. For the random access memory chip 252, the chip enable input *CE and output enable input *OE are connected to the outputs of OR gates 264 and 266, respectively, which also form part of the address control and decoding circuitry 166.

During a memory cycle, data is read from the ROM 250 by means of invertor 258 and OR gate 262 decoding the coincidence of a low logic level on the data select signal *DS and a high level on the data signal *DM, which applies an enabling signal to the memory 250. The address of the data desired is then set on address lines AD0–7 and address lines A8–A13, and the signals on the multiplexed address/data lines are clocked into the buffer 254 with the alternate select signal *AS. This operation will cause the ROM 250 to output the contents of the address on its inputs A1–A13 to the bus lines AD0–7 where they can be read by the microprocessor 160.

The random access memory 252 is read in a similar manner where OR gates 260 and 264 decode the coincidence of a high logic level on the data select signal *DS and a low logic level on the data signal *DM. Further, an enabling signal from the address line A15 is applied to one input of OR gate 260 to provide the chip enable signal to the RAM 252. For reading data from the RAM chip 252, OR gate 266 is further enabled by the chip enabling signal which is output from OR gate 264 and the inversion of the read/ write signal R/*W which is a high logic level in the read phase. This produces a low logic level output from OR gate 266 which enables the output of the RAM 252. With these signals present, the RAM chip 252 will load the contents of the addressed location onto the data bus AD0–AD7 where they can be read by the microprocessor 200.

For a write operation into the RAM chip 252, the microprocessor 160 initially latches the first eight address bits A1–A8 into buffer 254 and selects the rest of the address with address lines A9–A12. Data is then applied to the data bus and the read/write signal R/*W makes a transition to a low logic level and the *DS and *DM signals are applied such that the RAM is enabled. This will cause the memory 252 to store the data on bus lines AD0–7 into the location addressed.

A control decoder 256 generates control signals to permit data from the microprocessor 160 via bus lines AD0–7 to be loaded into control registers or to be read from control buffers. The control decoder 256 selects a control register or buffer via its outputs Y0–Y7 The particular register or buffer chosen is determined by the address lines A14, A15 which are applied to the inputs A,B of the decoder 256. The read/write signal R/*W is inverted and applied to the C input of the decoder 256 to allow the lower order outputs Y0–Y3 to control buffers which read from the data bus lines AD0–7 and the upper outputs Y4–Y7 to control registers which have data written into them from the data bus lines AD0–7. The control decoder 256 is selected by a high logic level on address line A15 being applied to its enabling input G1. The selection of the control decoder 256 and its timing with respect to a memory cycle are controlled by the memory timing signals *DS and *DM connected to enabling input *G2A and *G2B, respectively of the decoder.

The output Y0 is connected to the enabling input G1 of a buffer 284. A low logic level from the Y0 output of decoder 256 enables the logic levels on the inputs A1–A6 of the buffer 284 to be transferred to the outputs Y1–Y6 and therefore onto the address/data bus lines AD0–7 where they can be read by the microprocessor 160. The inputs A2–A6 of the buffer 284 allow the key pad 286 to input the data from its five keys to the microprocessor 160. To address the buffer 284, so that the data on its inputs can be read into the microprocessor, address lines A13, A14 are held low. The R/*W signal is held at a high logic level and the *DS and *DM signals are toggled synchronously with the reading of data from the buffer outputs 284. Similarly, the Y1 and Y2 outputs generate read signals *R1 and *R2 which are used to read the data from the registers of the multiplexing circuitry. For writing data to registers to control peripheral equipment, the outputs Y4–Y7 of the decoder 256 are used. The output Y5 latches 8-bits of data from the data bus lines AD0–7 into a dual converter register 272. The outputs Q1–Q8 of the register 272 are the control signals for the dual converter circuit. Outputs Q1 and Q2 control the input of the ground and reference voltages. Output Q3 controls the loading of the most significant and least significant bytes into the analog to digital converter. The output Q4 enables the analog to digital conversion by controlling the comparator voltage supply. Output Q5 is used as the DIGITAL OUTPUT signal $D_{out}$. The output Q6 is a strobe for the successive approximation register. The output Q7 is the analog to digital converter clock signal, ADCLK. The output Q8 is the digital to analog converter chip select signal DACCS. The register 272 is selected by the control decoder 256 setting address lines A13, A14 and A15 being set to binary 101. In this situation, the read/write signal R/*W is held at a low logic level and *DS and *DM signals toggled synchronously with applying data on the bus lines AD0–7.

Another control register 276 operates similarly and is controlled by the Y6 output of the decoder 256. Data from the address lines AD2–7 are latched into the Q3–Q8 outputs of the latch 276 when clocked. The data on address lines AD0 and AD1 are clocked into another register 270 with the same output on the falling edge of the Y6 output of the decoder 256 because of the inversion of the output by invertor 290. The Q1 output of the register 270 is the FAULT signal which controls the fault relay. The output Q2 of latch 270 provides the DATA ENABLE signal DE to the communications circuit 174. The outputs Q3–Q5 of latch 276 either light or disable the fault, transmit, and receive LEDs 282, 280, 278, respectively. The output Q6 of latch 276 generates the watchdog circuit reset signal WD. The outputs Q7 and Q8 of latch 276 generate the enabling signals RS and R/W for the LCD display 172.

Figure 10:
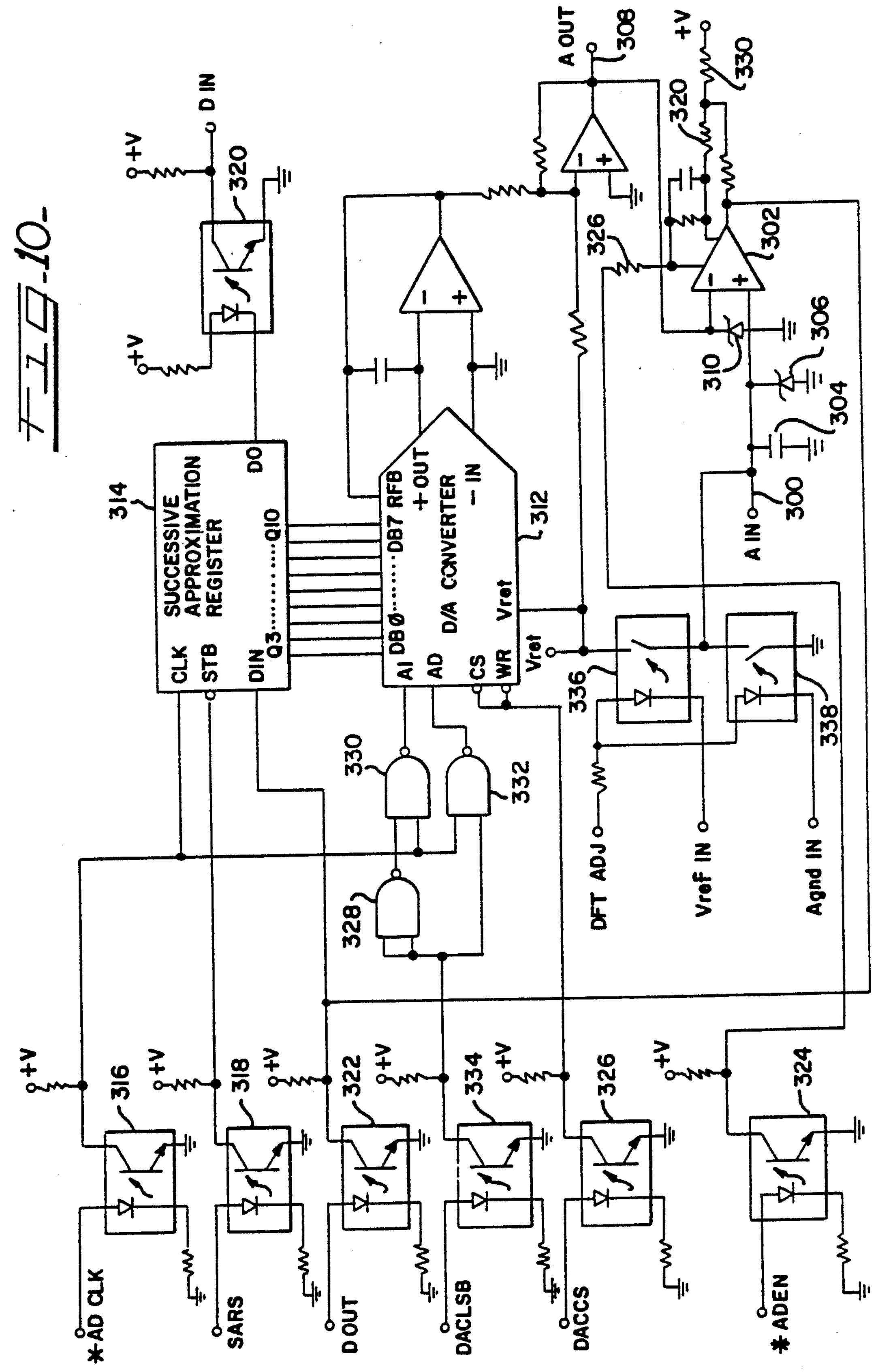
FIG. 10 is a detailed electrical schematic of the dual converter illustrated in FIG. 8.

The dual converter circuit 164 will now be more fully explained with reference to the detailed schematic in FIG. 10. The dual converter circuit serves as either an analog to digital converter or digital to analog converter, depending upon the control signals applied by the microprocessor 160. The dual converter consists basically of a digital to analog converter 312 and a successive approximation register 314. When converting from a digital value to an analog signal, the digital signal is output serially from the microprocessor 160 as the DIGITAL OUTPUT signal $D_{out}$ and shifted into the register 314. It is thereafter converted by the digital to analog converter 312 by strobing the digital value into the converter and output as the ANALOG OUTPUT signal $A_{out}$. For an analog to digital conversion, the analog signal is input as the ANALOG INPUT signal Ain to a comparator 302 and successively approximated and shifted into the register 314. While the conversion is taking place, the digital number is serially shifted from the register 314 to the microprocessor 160 as the DIGITAL IN signal $D_{in}$.

An analog to digital conversion for the dual converter will now be more fully described. The ANALOG IN signal $A_{in}$ is input to the non-inverting terminal of the comparator 302 from terminal 300. A capacitor 304 smooths the analog signal and Zener diode 306 provides over voltage protection for the input signal line. The analog signal chosen is by the multiplexing circuitry which has selected one of the sixteen input channels to convert. The comparator 302 has its inverting input connected to the analog output sign $A_{out}$ at terminal 308. Zener diode 310 provides over voltage protection for the inverting input of the comparator 302. The output of comparator 302 is a logic level signal which indicates whether the output voltage $A_{out}$ on line 308 is greater than or less than the input voltage $A_{in}$ on terminal 300. The analog output voltage on line 308 is developed from the D/A converter 312 which is controlled by the microprocessor 160 with register 314. Amplifier 305, 307 are configured to convert the current from D/A converter 312 into a voltage $A_{out}$ which is conditioned and level shifted.

The microprocessor 160 clocks the register 314 by applying the digital clock signal *ADCLK to an optically-coupled buffer 316 whose output is attached to the CLK input of the register 314. The microprocessor 160 strobes serial bits into the register 314 through an optically-coupled buffer 318 having a signal SARS connected to its input and whose output is connected to the strobe input STB of the register 314. The microprocessor 160 reads serial bits from the output D0 of register 314 through the optically-coupled buffer 320 which has its output coupled to the DIGITAL INPUT signal $D_{in}$ of the microprocessor. The microprocessor 160 outputs a serial digital signal to the successive approximation register 314 through an optically-coupled buffer 322 by providing the digital signal Dout at the input of the buffer and connecting its output to the input DIN of the register 314.

The analog to digital conversion cycle is initiated by enabling the comparator 302 via an optically-coupled buffer 324 with the logic signal *ADEN. The *ADEN logic signal removes ground from resistor 326 allowing comparator 302 to be supplied with power through resistors 328 and 330 from the power supply +V. The conversion cycle is then continued by supplying the successive approximation register 314 with a start bit via the $D_{out}$ signal which is strobed into the register with the SARS signal. The bit is shifted two places with two clock signals from the *ADCLK signal so that it sets the most significant bit in the digital to analog converter 312. At this point, all the rest of the lower order bits of the digital to analog converter 312 are zeroed.

The digital to analog converter 312 provides an analog signal representative of the bit at terminal 308. The comparator 302 compares the voltage at 308 from the digital to analog converter with the analog input signal at terminal 300. If the input signal is higher than the output, this indicates that the analog signal is in the upper half of the conversion range and a one is output via the $D_{out}$ signal and fed into the successive approximation register 314. A one clock period delay is built into the register 314 so that the data out signal DO equals the data in signal DIN one clock later. This bit then goes through the optically-coupled buffer 320 and is read into the microprocessor 200 as the first bit in the analog to digital conversion. Thereafter, the microprocessor steps through each of fourteen bits and, for each bit, a decision is made whether the input signal is above or below the digital to analog converter output.

The digital to analog converter 312 is selected for conversion through the optically-coupled buffer 326 whose input is the digital to analog conversion chip select signal, DACCS. The output of the buffer 326 is applied to the chip select input *CS and the read/write input *RW. A low logic level signal selects the chip for conversion and the read/write signal is used to either read input data from the register 314 or write the converted signal to the $+I_{out}$ and $-I_{out}$ outputs. The high and low bytes of the converter 312 are chosen by the address inputs A0 and A1. Code conversion NAND gates 328, 330 and 332 select either the most significant byte or least significant byte of the register by their connection to optically-coupled buffer 334. The output of buffer 316 is also applied to NAND gates 330 and 332 to provide an enabling signal on the low logic level phase of the clock signal, *ADCLK. When the low byte selection signal DACLSB is a low logic level then the output of NAND gate 328 is a low logic level and NAND gate 330 is enabled thereby selecting the most significant byte. Conversely, gate 332 will be disabled and does not supply an enabling signal to the least significant byte address input A0. When the selection signal DACLSB makes a transition to a high logic level, the output of the optically-coupled buffer 334 is pulled to ground enabling gate 332 and disabling gate 330. This operation selects the least significant byte address of the D/A converter 312 and allows the loading of the lower order byte.

To permit drift adjustment for the power supply, the dual converter circuit measures the reference voltage $V_{ref}$ and ground voltage every five minutes. This measurement takes place whether the dual converter is being used as an A/D converter in an input module or as a D/A converter in an output module. The voltage reference $V_{ref}$ is connected to the reference input of the D/A converter 312 and is further connected to the analog input terminal 300 through an optically-coupled solid state switch 336. The analog ground terminal is likewise connected to the analog input terminal 300 through an optically coupled solid state switch 338. In this manner, the dual converter can use its analog to digital conversion capability to convert these analog signals to a digital number which can be input and stored in the memory of microprocessor 160. The drift calculation is accomplished whether the module is an input module or an output module.

The switch 336 is controlled by the drift adjustment signal DFT ADJ and the voltage reference in signal, $V_{ref}$IN. In a similar manner, the solid state switch 338 is controlled by the drift adjustment signal DFT ADJ and the analog ground input signal, $A_{gnd}$ IN signal. The combination of a high logic level on the DFT ADJ signal and a low logic level on the $V_{ref}$IN signal closes switch 336 allowing an analog to digital conversion of the reference voltage. A high logic level on the DFT ADJ signal and a low logic level on the $A_{gnd}$ IN signal closes switch 338 to permit an analog to digital conversion of the ground voltage level.

Figure 11:
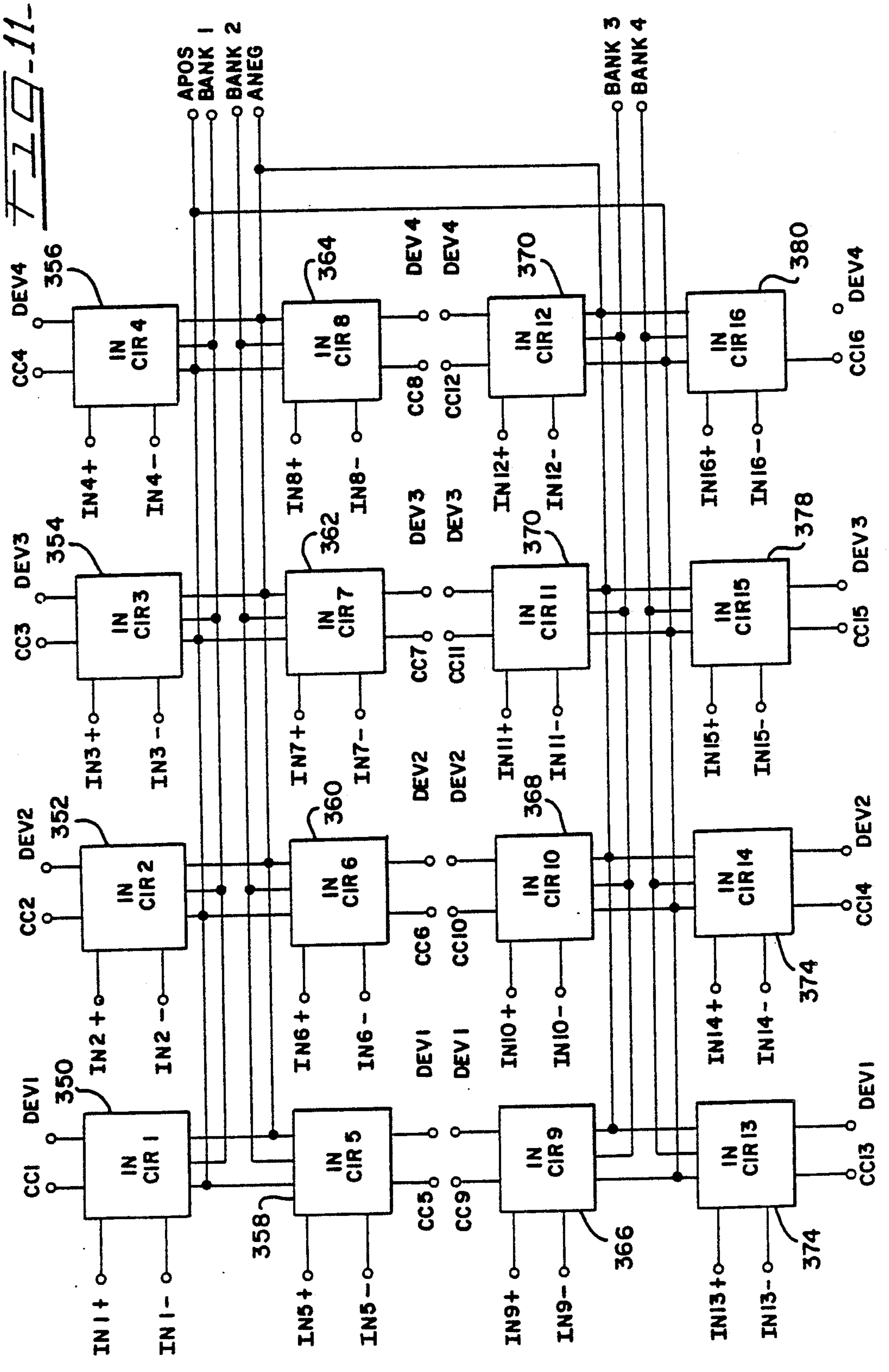
FIG. 11 is a detailed block diagram of the input circuits of the input, module illustrated in FIG. 6.

A more detailed description of the input circuits and multiplexing circuitry for one of the input modules will now be given with reference to FIG. 11 and FIG. 12. The figures disclose that an input module preferably has 16 configurable input circuits 350-380 which each have two analog inputs IN1–16(+), IN1–16(−); three outputs CC1–16, APOS, ANEG; and two enabling signal inputs, BANK 1∝4 and DEV 1–4. Each circuit is used to receive a parameter value from a sensor, transducer, transmitter, contact closure or the like. Notwithstanding the configuration of the circuit, the parameter value will be output as an analog voltage from the APOS, ANEG outputs or a logic level (HIGH, LOW) from the CC outputs. Selection of the particular input circuit is made by the coincidence of the enabling signals on both enabling inputs of a circuit. The discrete inputs CC1–16 can be read in parallel directly by the control processor.

Figure 12:
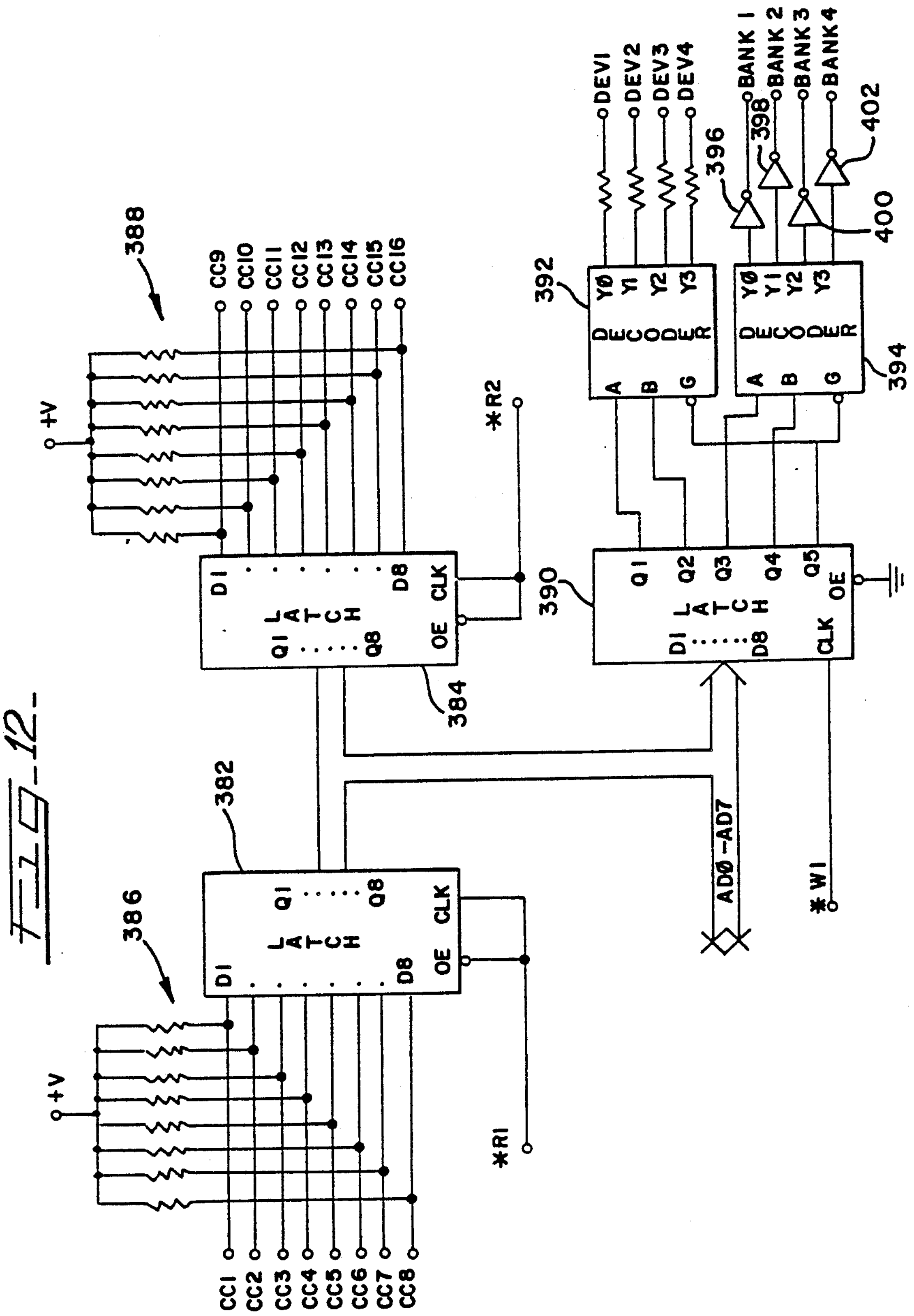
FIG. 12 is a detailed electrical schematic diagram of the multiplexing circuitry of the input module illustrated in FIG. 6.

In FIG. 12, the multiplexing circuitry which interfaces the input circuits to the control processor comprises two sections where one controls the input of the discrete signals CC1–16 and the other controls the input of the analog signals from the APOS, ANEG outputs. The discrete input section comprises two 8-bit digital latches 382, 384 where the inputs D1–D8 of the latch 382 are connected to the outputs CC1–CC8 of the input circuits 350–364 and the inputs D1–D8 of latch 384 are connected to the outputs CC9–CC16 of the input circuits 366–380. Each input CC1–16 is individually pulled up by an individual resistor of resistor groups 386, 388. The outputs QO–Q8 of both latches 382, 384 are connected to the address/data bus AD0–7 of the control processor. The output enable input *OE and the clock input CLK of the latch 382 are commonly connected to the read signal *R1 of the address control and decoding circuitry. The output enable input *OE and the clock input CLK of the latch 384 are commonly connected to the read signal *R2 of the address control and decoding circuitry.

Operationally, the control processor will initiate the reading of the logic levels of signals CC1–CC16 by first addressing the latch 382 and by asserting the read memory signal. This action causes the address control and decoding circuitry to generate the read discrete register 1 signal, *R1. When the *R1 signal is applied to the latch 382, the CC1–C8 logic levels from the input circuits 350–364 are latched into the Q1–Q8 outputs of the device and asserted on bus lines AD0–AD7 where they can be read by the microprocessor 160, thereby inputting the first byte of the discrete inputs. The second byte of the discrete inputs is read in a similar manner by the microprocessor 200 addressing the latch 384 and generating a memory read signal for that location. The signal *R2 from the address decoding and control circuitry causes the latch to transfer the logic levels of signals CC9–CC16 from the input circuits onto the data bus AD0–7, where they can be read into the memory of microprocessor 160.

The analog signal selection section of the multiplexing circuitry includes a clocked 8-bit latch 390 and two 4-bit control decoders 392, 394. The latch 390 has its inputs D1–D8 connected to the data bus lines AD0–AD7 and its outputs Q1–Q5 (Q6–Q8 are not connected) connected to the address inputs A, B and enable inputs *G of the decoders 392, 394. The outputs Q1, Q2 are connected to the enable inputs A, B, respectively of the decoder 392 and the outputs Q3, Q4 are connected to the inputs A, B, respectively of the decoder 394. The output Q5 is commonly connected to the enable input *G of both decoders. The decoder 392 converts the 2-bits of the inputs A, B into one of four outputs Y0–Y3 which correspond to the selection signals DEV1–4, respectively. The decoder 394 converts the 2-bits of the inputs A, B into one of four output Y0–Y3 which correspond to selection signals BANK1–4, respectively, after inversion by inverters 396–402. The output enable input *OE of the latch is enabled by connecting it to ground while the clock input CLK of the device is connected to the write A/D channel signal, *W1.

When the control processor wants to read the value of one of the analog inputs, it addresses the memory location mapped in memory space for the latch 390 and begins a write cycle. The channel address which corresponds to the desired input circuit is output from the microprocessor 160 onto the data bus AD0–AD7. The address decoding and control circuitry decodes the memory address signals and write signals into the write A/D channel signal *W1 which clocks the channel address into the latch 390 from the data bus lines AD0–7. The channel address is a 4-bit binary number selecting one of sixteen channels and one enabling bit. The five bits are output from outputs Q1–Q5 and decoded into the pairs of enabling selection signals. The decoder 394 will enable one bank of four input circuits with one of the signals BANK1–4 and the decoder 392 will select which one of the four is enabled with one of the signals DEV1–4. That device will provide an analog input to the dual converter which the microprocessor 160 will control to input the result. The cycle will continue until the values from all of the 16 channels have been read, converted, and stored, and will then repeat.

It is evident that if an input circuit is to read digital signals only, then elements 382, 384, 386, and 388 are those necessary to be installed in the multiplexing circuitry. If the input circuit is to read digital and analog signals (a universal adaptation) then both types of signals will be converted through the analog to digital converter and the direct reading circuitry is not used. In the later case, only elements 390, 392, and 394 with their associated circuitry will be installed.

Figures 13, 14:
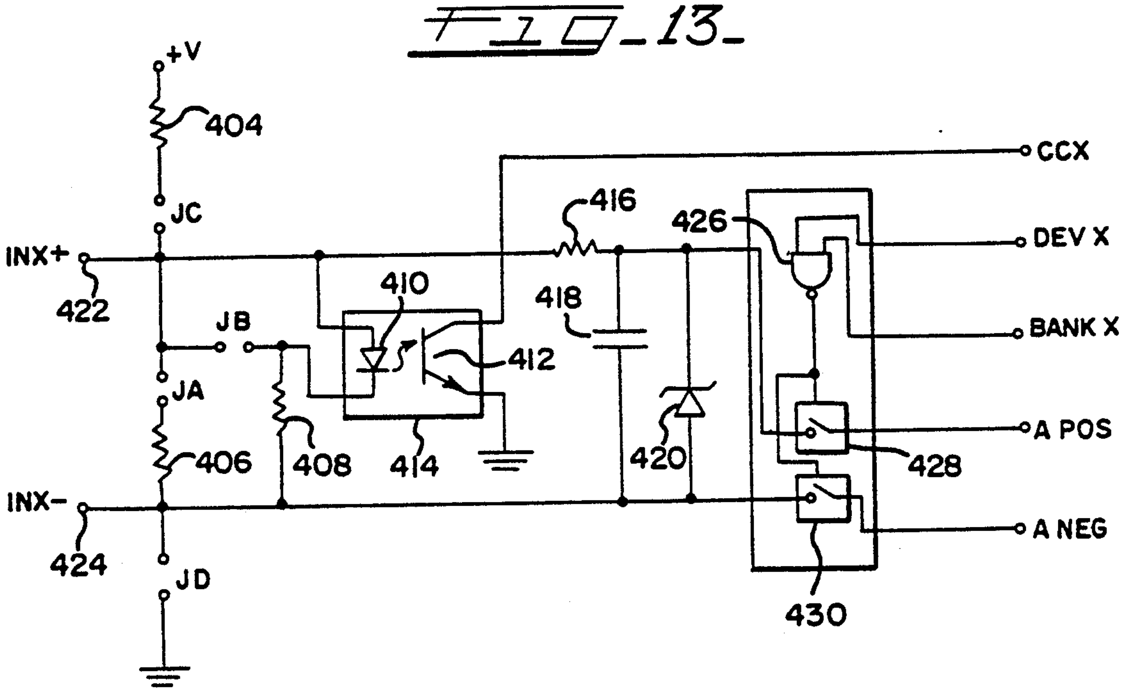
FIG. 13 is a detailed electrical schematic diagram of one of the input circuits illustrated in FIG. 11.
FIG. 14 is a tabular representation of the jumper connections for different configurations of the input circuit illustrated in FIG. 13.

FIG. 13 is a detailed schematic of an input circuit and is shown as configurable into a circuit which will accept a voltage, current, contact closure, or TTL input. The input is at terminals 422 and 424 labeled INx+ and INx−. Between the terminal 422 and a source of voltage +V, there can be connected a current limiting resistor 404 by means of a jumper JC. Between the two terminals 422, 424, a resistor 406 can be connected in series by means of a jumper JA. The terminal 424 can be connected to ground through jumper JD. Alternatively, a resistor 408 can be connected between terminals 422, 424 by means of a jumper JB.

A filter comprising resistor 416 and a capacitor 481 is supplied between terminal 422 and terminal 424 for high frequency noise rejection. A Zener diode 420 is connected between the two terminals for voltage protection. The two input terminals 422, 424 connect to switching contacts of solid state switches 428 and 430 which the other switching contacts output as the analog signal APOS and ANEG from output terminals 425, 427. The control terminals of the solid state switches 478, 430 are operated by the output of a NAND gate 426. The output of the NAND gate 426 closes the switches 428 and 430 when both enabling signals DEVx and BANKx are coincident are its inputs.

For a digital only contact closure input an optically-coupled buffer 414 comprising an LED 410 and NPN open collector transistor 412 are provided. The anode of the LED 410 is connected to the terminal 422 and the cathode is connected to the terminal 424 through a resistor 408. The cathode of the LED 410 may also be connected to the terminal 422 through a jumper JB. The collector of the transistor 412 generates the contact closure signal CCx while its emitter is connected to ground.

The options for the inputs to the circuit are for a voltage, current, contact closure, or a TTL compatible circuit. If the input circuit is receiving digital signals only, then elements 404 and 414 are installed exclusively in the circuit. In this instance, for a TTL input jumpers JC and JD are open. For a contact closure input, jumpers JC and JD are installed. If the input signals to a circuit are to be analog and digital signals (a universal adaptation), then the entire circuit is present. By arranging the jumpers as illustrated in the tabular FIG. 14 for the universal configuration, the particular input can be configured to produce the analog signal APOS, ANEG when enabled with the selection signals.

Figure 15:
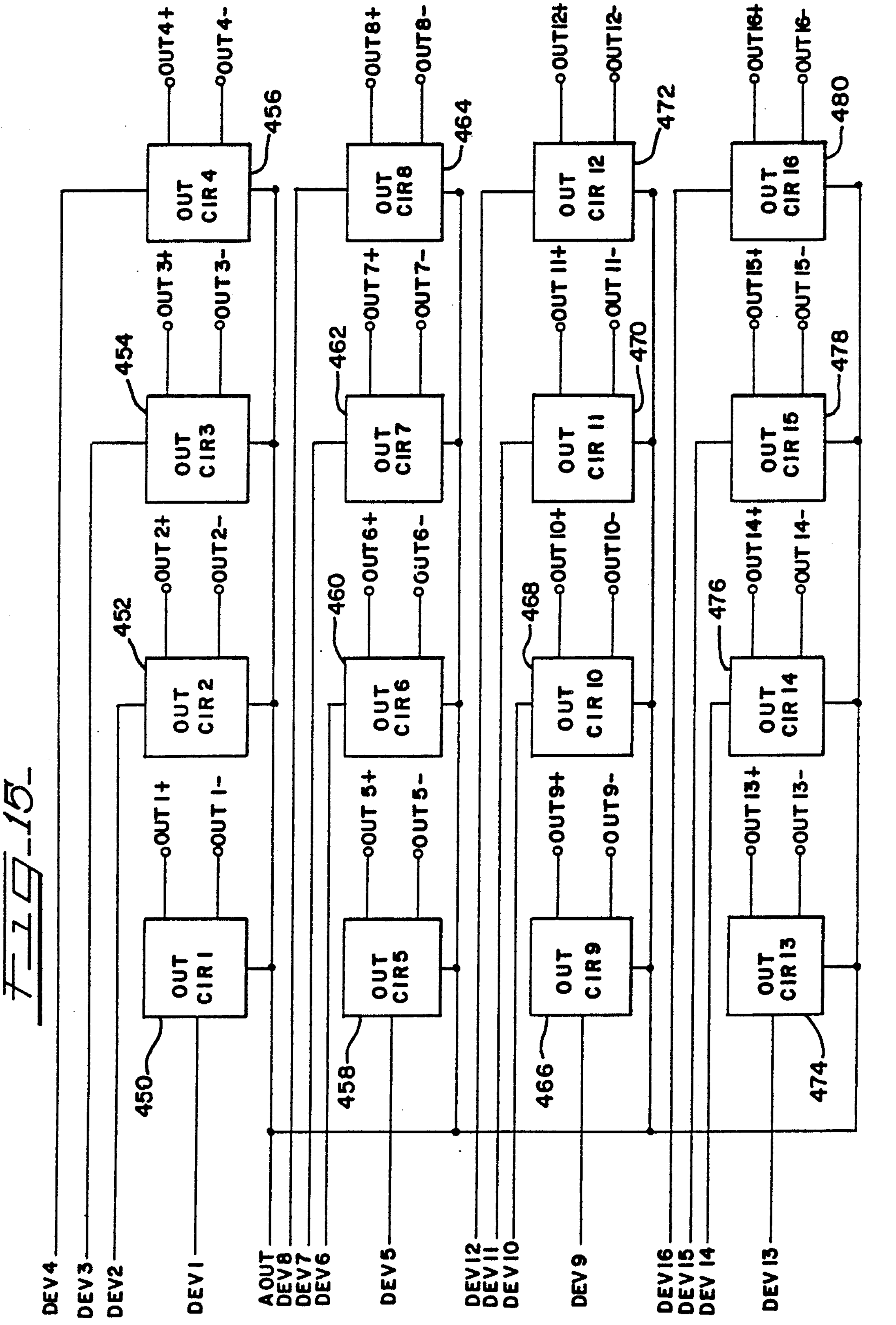
FIG. 15 is a detailed block diagram of the output circuits of the output module illustrated in FIG. 7.

A more detailed description of the output circuits and the demultiplexing circuitry for one of the output modules will now be given with reference to FIG. 15 and FIG. 16. The figures disclose that an output module preferably has 16 configurable output circuits 450–480 which each have one analog input $A_{out}$, one enabling input DEV1–16, and two outputs OUT1-16(+), OUT1-16(−). The input $A_{out}$ is the parameter value after digital to analog conversion transmitted from the corresponding input channel of an input module. The parameter value is output in a configurable format from one of the output terminal pairs OUT1-16(+), OUT1-16(−) when the particular channel is enabled. The format of the output signal is based on the configuration of the output circuit. The demultiplexing circuitry generates the enabling signals DEV1–DEV16 to select the channel which is used for output.

Figure 16:
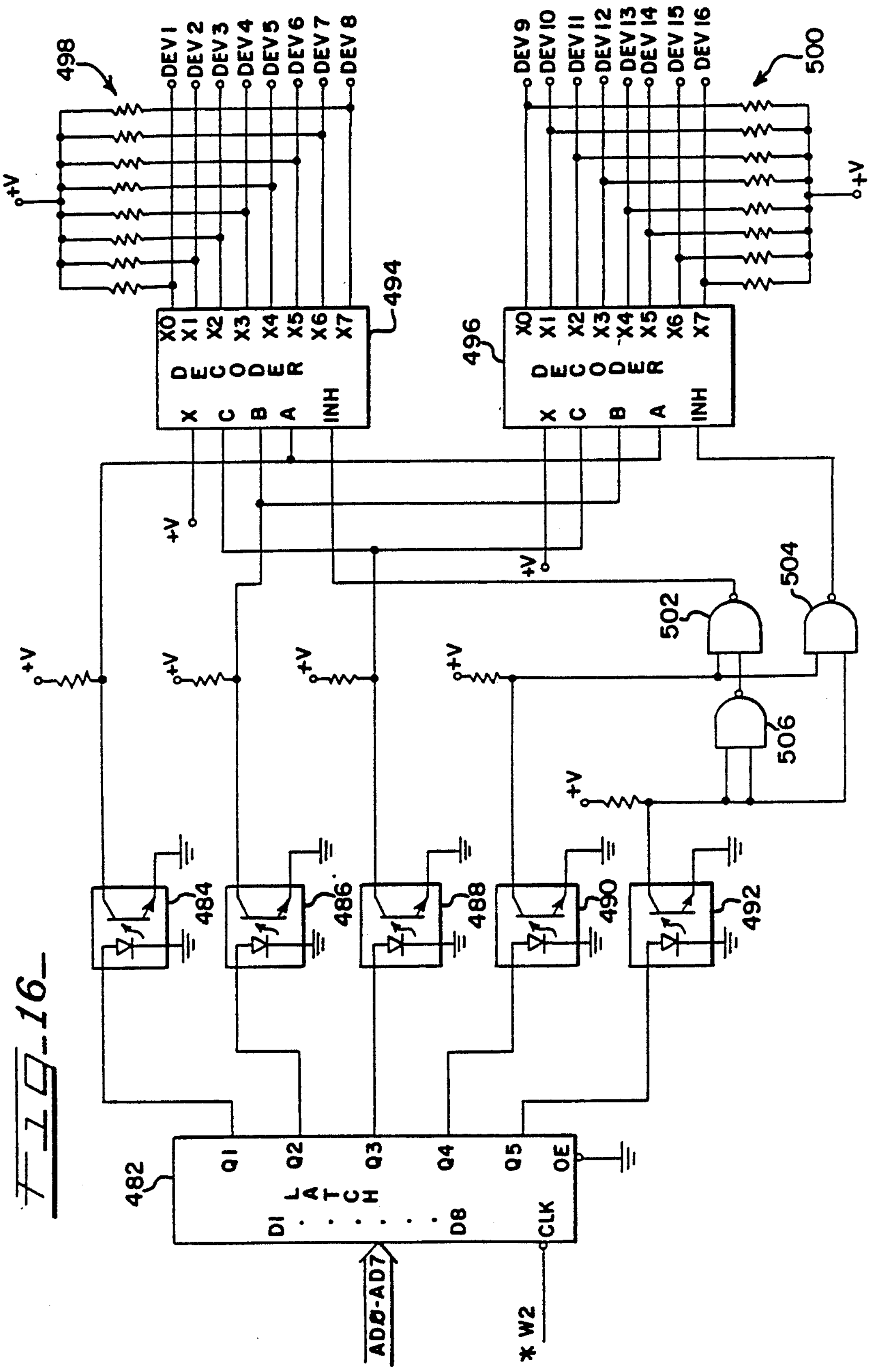
FIG. 16 is a detailed electrical schematic diagram of the demultiplexing circuitry of the output module illustrated in FIG. 7.

In FIG. 16, the demultiplexing circuitry includes an 8-bit clocked latch 482 which has its inputs D1–D8 connected to the data bus lines AD0–7. The outputs Q1–Q5 (Q6–Q8 are not connected) drive the LEDs of optically-coupled buffers 484, 486, 488, 490, and 492 respectively. The output enable input *OE of latch 482 is held at ground thereby permitting the inputs of the latch 482 to be clocked through to the outputs upon the application of a clocking signal. The clock input CLK of the latch 482 is connected to the write output channel address signal *W1 from the address control and decoding circuit.

The demultiplexing circuitry further includes two decoders 494, 496 which each have light outputs X0–7. The outputs of the decoder 494 generate the device enable signals DEV1–DEV8 while the outputs of the decoder 496 generate the device enable signal DEV-9–DEV16. Each output is pulled up by an individual resistor of the resistor groups 498, 500 respectively. The address inputs A, B, C of the decoders 494, 496 are connected to the collectors of the NPN photo-transistors of the optically-coupled buffers 484, 486, and 488.

The enable inputs X of the decoders 494, 496 are both tied to a positive enabling voltage +V. The clock inputs INH of the decoders 494, 496 are connected to the outputs of NAND gates 502, 504 respectively. The inputs of the NAND gate 502 are the output of the NPN photo-transistor of buffer 490 and the output of NAND gate 506. The inputs of the NAND gate 504 are the output of the photo-transistors of buffers 490, 492. Both inputs of the NAND gate 506 are tied to the output of the NPN photo-transistor of buffer 492.

To output a parameter value from one of the output circuits, the microprocessor 160 initially sends the parameter value in digital form to the dual converter. The dual converter performs a digital to analog conversion with changes the digital value into an analog voltage value representative of the parameter value. This representative value is then output as the signal $A_{out}$. After the $A_{out}$ value has been established and provided at the inputs to all sixteen output circuits, the microprocessor 160 selects the channel from which it will be output. The microprocessor 160 begins a write cycle where the channel address of the selected output circuit is written onto the data bus. A memory address representing the address of register 482 is applied to the address control and decoding circuit concurrently with the memory write signal. The address control and decoding circuit generates the write output channel signal *W1 from these signals. The generation of the signal *W1 causes the channel address on the data bus AD0–AD7 to be loaded into the latch 482 and thereafter decoded into one of the selection signals DEV1–16.

Figures 17, 18:
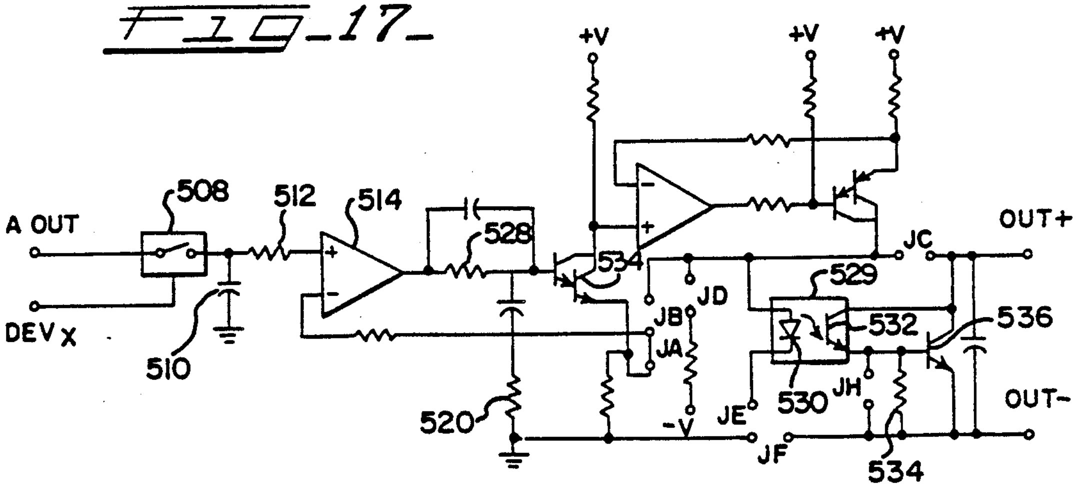
FIG. 17 is a detailed electrical schematic diagram of one of the output circuits illustrated in FIG. 15.
FIG. 18 is a tabular representation of the jumper connections for the different configurations of the output circuit illustrated in FIG. 17.

The detailed circuitry for one of the output circuits is more clearly shown in FIG. 17. The output circuit is a configurable circuit which uses jumpers to connect different circuitry to provide either a voltage, current, contact closure, or TTL compatible output from a standardized voltage input. The voltage input comes from the dual converter circuit as the analog voltage $A_{out}$. The $A_{out}$ signal is applied to one terminal of a solid state switch 508 which is operated by the selection signal DEVx. The analog signal is sampled and held by capacitor 510 and resistor 512 before being input to the non-inverting input of operational amplifier 514. The inverting input of the operational amplifier can be connected to ground through resistor 522 and a jumper JA. Alternatively, the inverting input of operational amplifier 514 can be connected to the output terminal OUT+ via jumper JB. The output of amplifier 514 feeds a resistor divider comprising resistors 518 and 520 which are connected at their junction to the base of a Darlington NPN transistor pair 524. The collector of the transistor pair 524 is connected to the noninverting input of operational amplifier 523 and the emitter is connected to ground through the resistor 522. The output of the operational amplifier 523 can also be connected to the output terminal OUT+ via the resistor 516 and jumper JC.

Further connected between the output terminal OUT+ and OUT− is a NPN transistor 536 forming the second amplifier in a Darlington transistor pair. The first transistor in the pair is NPN transistor 532 which forms part of an optically-coupled buffer 529, also having a LED 530. The LED 530 can be connected between the output terminal OUT+ and the output terminal OUT− via the jumper JE. The emitter of transistor 532 is connected to the base of transistor 536 and has a biasing resistor 534 connected between that point and the output terminal OUT−. A jumper JH can be connected in parallel with the resistor 534. Depending upon the configuration of the jumpers as set forth in the tabular representation in FIG. 18, the output circuit will produce either a voltage, current, contact closure, or TTL compatible signal.

Figure 19:
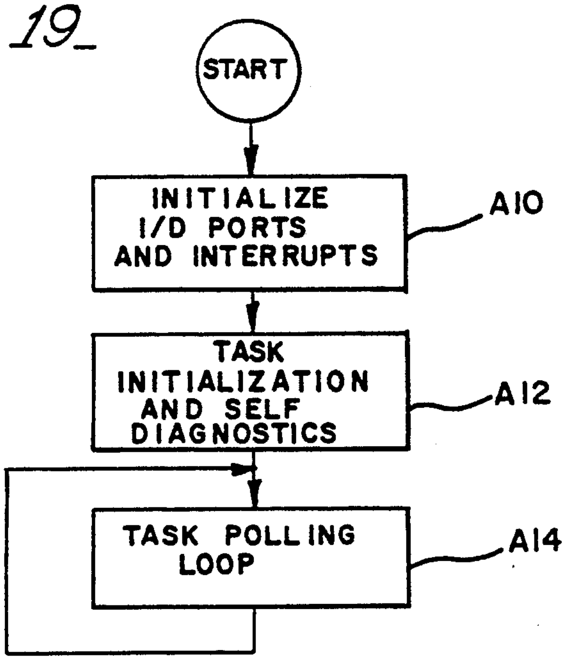
FIG. 19 is a general flowchart of the MAIN subroutine of the input module illustrated in FIG. 6.
Figure 20:
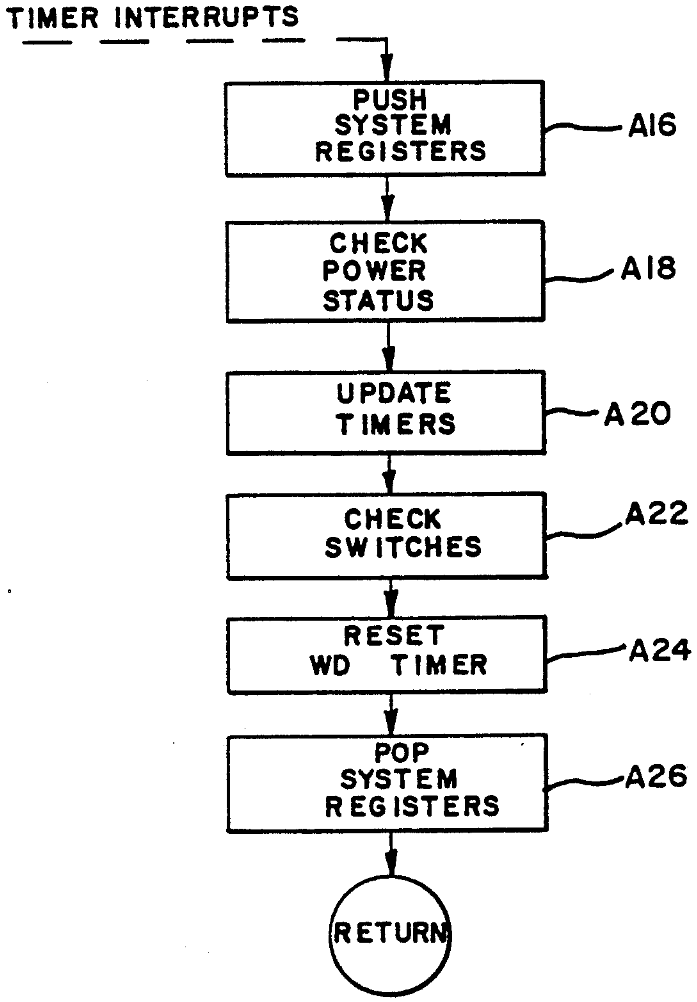
FIG. 20 is a detailed flowchart of the interrupt routine of the input module illustrated in FIG. 6.

The main program for the input module is more fully set forth in a system flowchart in FIG. 19. Upon the start up of an input module, the program first initializes the I/O ports and interrupts of the microprocessor 160 in Block A10. Next, the tasks which the program controls are initialized and a self-diagnostic routine is run in Block A12. Thereafter, an operation loop comprising all the normal tasks of the input module is entered in Block A14. In general, these tasks include converting the analog inputs to digital values, updating the digital values in memory, displaying the updated values, and communicating the digital values to a corresponding output module. Running concurrently on an interrupt basis with the main program, an input module has a timer routine which is more fully shown in FIG. 20. The subroutine is called once every 250 microseconds by a timer interrupt and causes an exit from the main program of FIG. 19 at that point. When it is finished, the system resumes the continuous loop in Block A14 at the point where it exited.

The first thing that the subroutine does is to save the system configuration in Block A16 by pushing the system register contents onto the stack. Next, in Block A18, the status of the power is checked by the microprocessor 160 by reading the low power signal. Thereafter, a plurality of timers are updated in Block A20 by incrementing counters. This adds approximately a millisecond to every counter during a pass through the interrupt subroutine. In Block A22, the input switches are checked to determine if there has been any actuation and the result is saved. The watch dog timer is then reset in Block A28 to maintain the input module in an operative condition. The contents of the system register are then popped off the stack to restore the system configuration in Block A26 before the routine returns to the task polling loop in Block A14.

Figure 21:
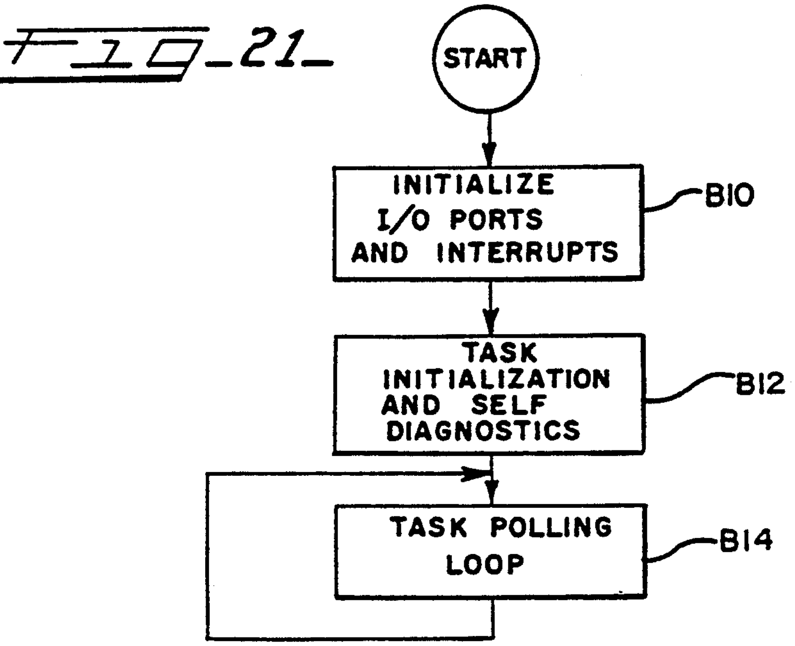
FIG. 21 is a general flowchart of the MAIN subroutine of the output module illustrated in FIG. 7.
Figure 22:
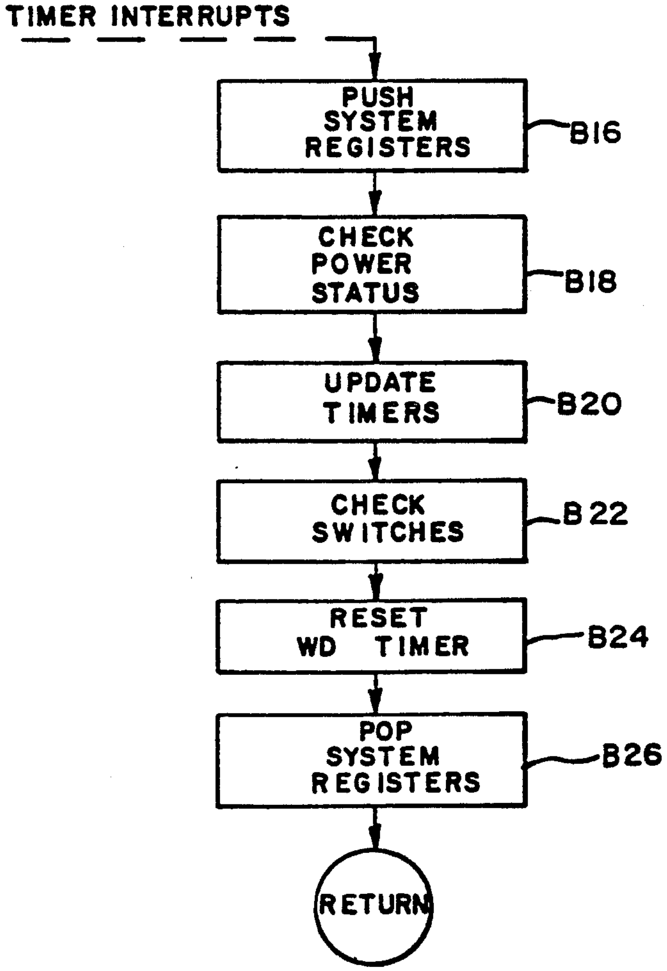
FIG. 22 is a detailed flowchart of the interrupt routine of the output module illustrated in FIG. 7.

The main program for the output module is more fully set forth in the system flowchart in FIG. 21. On the start up of a output module, the program first initializes the I/O ports and interrupts of the microprocessor 160 in Block B10. Next, the tasks which the program controls are initialized and a self-diagnostic routine is run in Block B12. Thereafter, an operation loop comprising all the normal tasks of the output module is entered in Block B14. In general, these tasks include converting the digital values to the standardized analog signal, outputting the analog signal to the correct output circuit, displaying the received values, and receiving communications of the digital values from a corresponding input module. Running concurrently on an interrupt basis with the main program, an output module has a timer routine which is more fully shown in FIG. 22. The subroutine is called once every millisecond by a timer interrupt and causes an exit from the main program of FIG. 21 at that point. When it is finished, the system resumes a continuous loop in Block B14 at the point where it exited.

The first thing that the subroutine does is to save the system configuration in Block B16 by pushing the system register contents onto the stack. Next, in Block B18, the status of the power is checked by the microprocessor 160 by reading the low power signal. Thereafter, a plurality of timers are updated in Block B20 by incrementing counters. This adds approximately a millisecond to every counter during a pass through the interrupt subroutine. In Block B22, the input switches are checked to determine if there has been any actuation and the result is saved. The watchdog timer is then reset in Block B24 to maintain the output module in an operative condition. The contents of the system register are then popped off the stack to restore the system configuration in Block B26 before the routine returns to the task polling loop in Block B14.

Figure 23:
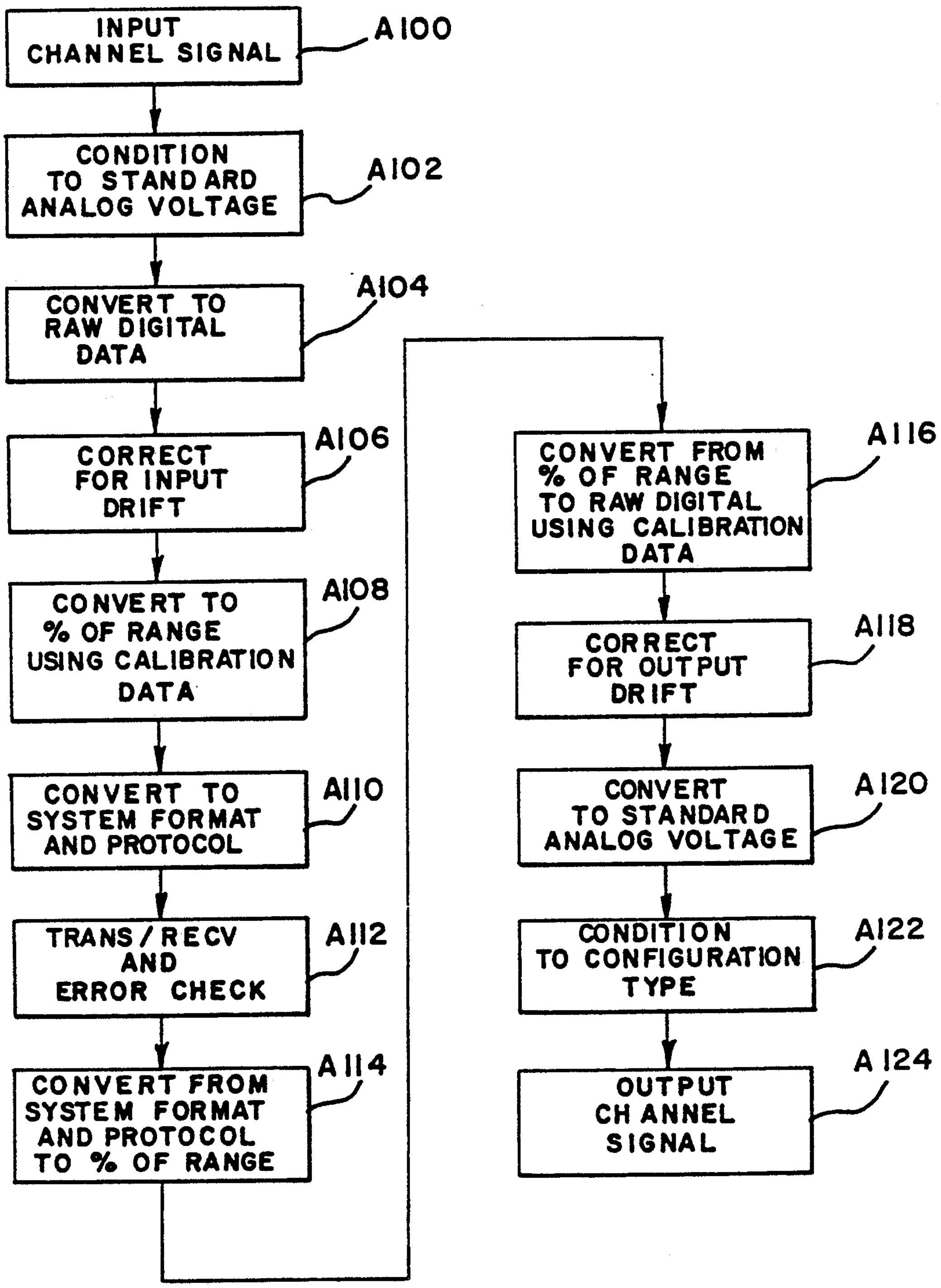
FIG. 23 is a representative flowchart of the conversion and communication of an analog parameter value from input to output.

With reference now to FIG. 23 and the program flowcharts in FIGS. 19–22, the system operation is as follows. Normally, the system is in the communication mode where the input channel parameters are being converted and stored in an input module by multiplexing the individual channels. The control processor selects a channel Blocks A100, A102, converts it Block A104, corrects it for drift Block A106, converts it into a percentage of the calibrative range for the channel Block A108 and then stores the value. Once the control processor has stepped through all 16 channels for an input module, the image of the values are updated and the conversion process periodically repeated. The timing of the conversion process is accomplished by the timer routine setting and clearing timers allowing the main routine to check for time outs and provide the correct control signals at the right times.

Communication of the image data over the link 10 is performed similarly on a timer basis. An input module when the initialization part of the main program is run, reads the configuration file and determines whether it is the link master. If it is the link master, then a variable is set which enables the polling software which is built into every input module main program. The polling commands are output from the link master with the communication circuit on the basis of several poll timers. The receipt of the ready messages by the link master is accomplished on an interrupt basis to change the polling sequence for those modules which are present and operative.

When an input module has permission to communicate it produces a wake up message on the data message based on a set of communication timers and a communication subroutine. The communications subroutine converts the image data into the system format of the data message and outputs the data message in the system protocol Blocks A110, A112.

The output modules contain a communications subroutine which is also interrupt driven to store asynchronous characters received on the link in a buffer and then process them in the main loop. The communications subroutine of an output module also has timer driven output to reply to the wake up message of its associated input module. The data message which is received over the link is checked for errors and decoded into output image data in percent of range format in Blocks A112, A114.

The output modules have a digital to analog conversion routine which operates as part of the main loop to process the output image data and distribute it to the output channels on a timer basis. Periodically, a channel is selected and the percentage data for that data converted to a raw digital number from the calibration data stored for that channel, Block A116 and corrected for output drift by the corrections factor stored Bock A118. The digital data is then converted into an analog voltage Block A120 before being output to an output circuit Block A122, A124.

Each of the main programs of the input and output modules also includes a check switches subroutine which reviews the status of the switch settings. This subroutine can switch the module from the communication mode to any of the other modes depending upon the status of the selections key. The switches are read during the interrupt subroutine and their status is stored for processing by this routine.

The main routine of each module further includes a display subroutine which updates the LCD display on a timer basis. The display which the subroutine outputs is determined by the mode of the module, and the status of the different operator keys.

While a preferred embodiment of the invention has been shown and described in detail, it will be obvious to those skilled in the art that various modifications and changes may be made thereto without departing from the spirit and scope of the invention as hereinafter defined in the appended claims.

What is claimed is:

1. A method of communicating analog input signal values from multiple input points over a communications link to corresponding multiple output points to become analog output signal values, said method comprising the steps of:

forming said multiple input points into input groups;

forming said multiple output points into corresponding output groups;

converting said analog input signal values to input digital values;

storing said input digital values;

generating a polling sequence in which each input group is interrogated as to its presence or operational status by generating a wake-up message comprising at least one unique digital character recognizable by an input group as a wake-up message and at least one unique digital character recognizable as the address of the selected group, and by receiving a ready message from the addressed group comprising at least one unique digital character recognizable as a ready message and at least one unique digital character recognizable as the address of the selected group;

enabling an input group to communicate with its corresponding output group during a predetermined time slot associated with the position of the input group in the polling sequence;

transmitting said stored input digital values over the communications link from an input group to its corresponding output group;

receiving said transmitted digital values over the communications link;

storing said received digital values; and converting said stored received digital values to represent the analog output signal values.

2. The method as set forth in claim 1 wherein the step of generating a polling sequence further comprises the steps of:

generating a go-ahead message comprising at least one unique digital character recognizable as a go-ahead message, if a ready message is received; and selecting and polling the next group in the polling sequence, if a ready message is not received.

3. The method as set forth in claim 2 wherein the step of generating a polling sequence further comprises the steps of:

delaying the selection and polling of the next group in the polling sequence for a predetermined period of time after the go-ahead message has been sent.

4. The method as set forth in claim 1 wherein the step of transmitting the digital values includes the steps of:

generating a wake-up message by an input group to its associated output group which comprises at least one unique digital character recognizable as a wake-up message and at least one unique digital character recognizable as the address of the output group; and receiving a ready message from the selected output group comprising at least one unique digital character recognizable as a ready message and at least one unique digital character recognizable as the address of the selected input group.

5. A method as set forth in claim 4 wherein the step of transmitting digital values further includes the steps of:

transmitting a data message to the selected output group if the ready message has been received; and terminating the transmitting step, if the ready message has not been received.

6. A method as set forth in claim 5 wherein the step of transmitting a data message includes the steps of:

generating a unique digital character recognizable as a data message;

transmitting said digital values of the input group in an ordered sequence; and transmitting a check sum which is the sum of the digital values of the input group and the data character.

7. A method as set forth in claim 1 wherein the step of converting the analog signals into digital values further includes the steps of:

converting the analog signal into a percentage of a range.

8. A method as set forth in claim 7 which further includes the steps of:

calibrating the system by assigning said analog input signal values a range with a zero value and a full value.

9. A method as set forth in claim 1 which further includes the steps of:

configuring the input points and output points into a communications system by assigning different addresses to each group.

10. A method as set forth in claim 9 which further includes the step of:

configuring the input and output points of each group by assigning corresponding addresses to an input point and output point pair.

11. A multipoint communications system for transferring data over a communications link among a plurality of communications modules, said system comprising:

a communications link;

a plurality of input modules connected to said communications link, each of said input modules including means for converting an input signal into representative digital data; and a plurality of output modules connected to said communications link, each of said output modules including means for converting said digital data into an output signal which is representative of said input signal;

wherein each of said input modules directly communicates with a corresponding output module over said communications link; and wherein one of said modules, named a link master, includes means for communicating with at least all input modules and for controlling the communications on said communications link according to the following steps:

(a) sending a wake-up message from the link master to a first input module;

(b) receiving the wake-up message and sending a ready message from the first input module to the link master;

(c) receiving the ready message and sending a go-ahead message from the link master to the first input module;

(d) receiving the go-ahead message and sending a wake-up message from the first input module to a first output module;

(e) receiving the wake-up message and sending a ready message from the first output module to the first input module;

(f) receiving the ready message and sending a data message from the first input module to the first output module.

12. A multipoint communications system as set forth in claim 11, wherein each input module includes:

means for inputting one of several types of analog signals;

means for conditioning said one analog signal to an analog voltage;

means for converting said analog voltage to a raw digital value;

means for converting said raw digital value to an absolute digital value which is indicative of the percentage of the range of values which said one analog signal can represent using predetermined range values;

means for transmitting said absolute digital value over said communication link.

13. A multipoint communications system as set forth in claim 12, wherein each output module includes:

means for receiving said absolute digital value from said communications link;

means for converting said absolute digital value to a raw digital value using predetermined range values;

means for converting said raw digital value to an analog voltage;

means for conditioning said analog voltage to represent said one analog signal; and means for outputting said conditioned analog signal.

14. A multipoint communications system as set forth in claim 11, wherein said communications link is a two-wire link.

15. A multipoint communications system as set forth in claim 11, wherein each of said input modules includes means for inputting a plurality of input signals.

16. A multipoint communications system for transferring data over a two-wire communications link among a plurality of communications modules, said system comprising:

a two-wire communications link;

a plurality of input modules connected to said communications link, each of said input modules including means for converting a plurality of voltage or current input signals into representative serial data; and a plurality of output modules connected to said communications link, each of said output modules including means for converting serial data into a plurality of representative voltage or current output signals;

wherein each of said input modules communicates directly with a corresponding output module over said communications link;

wherein one of said modules, named a link master, includes means for communicating with all module pairs and for controlling the communications on said communications link according to a polling protocol wherein each module to receive a communication first acknowledges its presence before the communication is transmitted; and wherein said polling protocol is performed according to the following steps:

(a) sending a wake-up message from the link master to a first input module;

(b) receiving the wake-up message and sending a ready message from the first input module to the link master;

(c) receiving the ready message and sending a go-ahead message from the link master to the first input module;

(d) receiving the go-ahead message and sending a wake-up message from the first input module to a first output module;

(e) receiving the wake-up message and sending a ready message from the first output module to the first input module;

(f) receiving the ready message and sending a data message from the first input module to the first output module.

* * * * *